(12) United States Patent  
Lidsky et al.

(10) Patent No.: US 10,784,769 B2  
(45) Date of Patent: Sep. 22, 2020

(54) RESONANT REGULATOR FOR LIGHT LOAD CONDITIONS

(71) Applicant: EMPOWER SEMICONDUCTOR, INC., Newark, CA (US)

(72) Inventors: David Lidsky, Oakland, CA (US); Timothy Alan Phillips, Hope, RI (US); Parag Oak, Sunnyvale, CA (US)

(73) Assignee: Empower Semiconductor, Inc., Newark, CA (US)

( * ) Notice: Subject to any disclaimer, the term of this patent is extended or adjusted under 35 U.S.C. 154(b) by 0 days.

(21) Appl. No.: 16/584,937

(22) Filed: Sep. 26, 2019

(65) Prior Publication Data

US 2020/0112242 A1 Apr. 9, 2020

Related U.S. Application Data

(63) Continuation of application No. 16/215,203, filed on Dec. 10, 2018, now Pat. No. 10,468,963, which is a  
(Continued)

(51) Int. Cl.
*H02M 1/08* (2006.01)  
*H02M 3/158* (2006.01)  
*H02M 1/00* (2006.01)

(52) U.S. Cl.
CPC ............. *H02M 1/08* (2013.01); *H02M 3/158* (2013.01); *H02M 2001/0003* (2013.01); *H02M 2001/0058* (2013.01)

(58) Field of Classification Search
CPC ........ H02M 1/08; H02M 1/088; H02M 3/156; H02M 3/158; H02M 2001/003; H02M 2003/156

See application file for complete search history.

(56) References Cited

U.S. PATENT DOCUMENTS 6,819,573 B2 11/2004 Hazucha  
8,212,537 B2 7/2012 Carpenter et al.  
(Continued)

FOREIGN PATENT DOCUMENTS

| CN | 101018017 A | 8/2007 |
| TW | I681614 | 1/2020 |
| WO | 2014007745 | 1/2014 |

OTHER PUBLICATIONS

U.S. Appl. No. 15/640,335, "Non Final Office Action", dated May 2, 2016, 11 Pages.  
(Continued)

*Primary Examiner* — Matthew V Nguyen  
(74) *Attorney, Agent, or Firm* — Kilpatrick Townsend & Stockton LLP

(57) ABSTRACT

A power conversion circuit includes a plurality of solid-state switches coupled between an input terminal and a ground. An output terminal is positioned between two of the plurality of solid-state switches and an inductor is coupled between the output terminal and a load. A capacitor is coupled in parallel with two of the serially connected solid-state switches. A controller controls the plurality of solid-state switches to generate a current in the inductor by repetitively (1) charging the capacitor causing a temporary increase in the current in the inductor, (2) entering a first wait state that configures the plurality of solid-state switches to maintain the capacitor in a charged state, (3) discharging the capacitor causing a temporary increase in the current in the inductor and (4) entering a second wait state that configures the plurality of solid-state switches to maintain the capacitor in a discharged state.

20 Claims, 23 Drawing Sheets

Related U.S. Application Data continuation of application No. 15/640,335, filed on Jun. 30, 2017, now Pat. No. 10,186,945.

(56) References Cited

U.S. PATENT DOCUMENTS

| | | | |
|---|---|---|---|
| 9,899,918 B2* | 2/2018 | Lee | H02M 3/158 |
| 10,186,945 B1 | 1/2019 | Lidsky et al. | |
| 10,468,963 B2* | 11/2019 | Lidsky | H02M 3/158 |
| 2004/0145919 A1 | 7/2004 | Hazucha | |
| 2009/0033266 A1 | 2/2009 | Kreinbrink | |
| 2014/0006833 A1 | 1/2014 | Ma et al. | |
| 2014/0210429 A1 | 7/2014 | Dally | |
| 2014/0232364 A1 | 8/2014 | Thomas et al. | |
| 2016/0013734 A1 | 1/2016 | White | |
| 2016/0129796 A1 | 5/2016 | Tomura et al. | |
| 2016/0261189 A1 | 9/2016 | Lidsky et al. | |
| 2016/0329809 A1 | 11/2016 | Granato et al. | |
| 2017/0194860 A1 | 7/2017 | Oak et al. | |
| 2017/0331374 A1* | 11/2017 | Høyerby | H02M 3/07 |
| 2017/0353116 A1 | 12/2017 | Zhang et al. | |
| 2017/0373598 A1 | 12/2017 | Nishimura et al. | |
| 2018/0026518 A1* | 1/2018 | Liu | H02M 3/1584 323/312 |
| 2018/0054121 A1 | 2/2018 | Chen et al. | |

OTHER PUBLICATIONS

U.S. Appl. No. 15/640,335, "Notice of Allowance", dated Sep. 11, 2018, 6 pages.
U.S. Appl. No. 16/215,203, "Non-Final Office Action", dated Jan. 29.2019, 13 pages.
U.S. Appl. No. 16/215,203, "Notice of Allowance", dated Jun. 27, 2019; 5 pages.
PCT/US2018/039697, "International Search Report and Written Opinion", dated Oct. 8, 2018, 9 pages.
TW107122587, "Notice of Decision to Grant", dated Sep. 3, 2019, 4 pages.
TW107122587, "Office Action", dated Apr. 11, 2019, 3 pages.
CN201880003647.6, "Office Action", dated Feb. 3, 2020, 8 pages.
PCT/US2018/039697, "International Preliminary Report on Patentability", dated Jan. 9, 2020, 6 pages.

* cited by examiner

RESONANT REGULATOR FOR LIGHT LOAD CONDITIONS

CROSS-REFERENCE TO RELATED APPLICATIONS

This application is a continuation of U.S. patent application Ser. No. 16/215,203, which was filed on Dec. 10, 2018, which issued as U.S. Pat. No. 10,468,963, on Nov. 5, 2019, which is a continuation of U.S. patent application Ser. No. 15/640,335, which was filed on Jun. 30, 2017, which issued as U.S. Pat. No. 10,186,945, on Jan. 22, 2019. The contents of the aforementioned applications are incorporated herein by reference in their entirety.

FIELD

The present invention relates generally to switched-mode power regulators and in particular to power regulators that operate at high frequencies with high efficiency.

BACKGROUND

A wide variety of electronic devices are available for consumers today. Many of these devices have integrated circuits that are powered by regulated low voltage DC power sources. These low voltage power sources are often generated by dedicated power regulator circuits that use a higher voltage input from a battery or another power source. In some applications, the dedicated power regulator circuit can be one of the largest power dissipating components of the electronic device and can sometimes consume more space than the integrated circuit that it powers.

As electronic devices become more sophisticated and more compact, the size, the performance and the efficiency of the dedicated power regulator circuits needs to be improved. Increased switching frequency of the power regulator circuit has been one of the primary design advances to address these competing requirements. Increased switching frequency reduces the size and typically the cost of the large passive components (e.g., capacitors and inductors) while also enabling the power regulator to respond to faster transient requirements. The difficulty with increased switching frequency is typically the increased switching losses associated with the increased number of switching cycles (i.e., decreased efficiency). New methods of reducing the size and improving the efficiency of power regulator circuits are needed to meet the needs of future electronic devices.

SUMMARY

In some embodiments a power conversion circuit comprises a first terminal, a first solid-state switch having a pair of first switch terminals and a first control terminal wherein the pair of first switch terminals are connected between the first terminal and a first junction. A second solid-state switch has a pair of second switch terminals and a second control terminal wherein the pair of second switch terminals are connected between the first junction and a second junction. A third solid-state switch has a pair of third switch terminals and a third control terminal wherein the pair of third switch terminals are connected between the second junction and a third junction. A fourth solid-state switch has a pair of fourth switch terminals and a fourth control terminal wherein the pair of fourth switch terminals are connected between the third junction and a ground. A capacitor is coupled between the first junction and the third junction, and an inductor is coupled between the second junction and a load. A controller transmits control signals to control the first, second, third and fourth solid-state switches through the first, second, third and fourth control terminals, respectively, such that a voltage at the load is regulated by repetitively (1) charging the capacitor causing an increase in current flow in the inductor followed by a decrease in current flow in the inductor and before the current flow in the inductor stops, (2) discharging the capacitor causing an increase in current flow in the inductor followed by a decrease in current flow in the inductor and before the current flow in the inductor stops, repeating (1).

In some embodiments the power conversion circuit generates a first preflux condition in the inductor before (1). In various embodiments during the first preflux condition the first and the second solid-state switches are in an on state. In some embodiments a second preflux condition is generated in the inductor before (2). In various embodiments during the second preflux condition the second and the fourth solid-state switches are in an on state.

In some embodiments after the decrease in current flow the inductor in (1) the first, the third and the fourth solid-state switches are in an on state. In various embodiments after the decrease in current flow the inductor in (2) the second, the third and the fourth solid-state switches are in an on state. In some embodiments when repetitively performing (1) and (2) a continuous current flows through the inductor.

In some embodiments the controller allows the current flow in the inductor to stop in (1) and in response controls the first and the fourth solid-state switches into an on-state and the second and third solid-state switches into an off state. In various embodiments the controller controls the first and the fourth solid-state switches into an on-state and the second and third solid-state switches into an off state in response to a voltage at the load being above a predetermined threshold voltage. In some embodiments the controller allows the current flow in the inductor to stop in (2) and in response controls the second and the third solid-state switches into an on-state and the first and fourth solid-state switches into an off state. In various embodiments the circuit is disposed on a unitary semiconductor die that includes the load.

In some embodiments a power conversion circuit comprises a first terminal, a first solid-state switch having a pair of first switch terminals and a first control terminal wherein the pair of first switch terminals are connected between the first terminal and a first junction. A second solid-state switch having a pair of second switch terminals and a second control terminal wherein the pair of second switch terminals are connected between the first junction and a second junction. A third solid-state switch having a pair of third switch terminals and a third control terminal wherein the pair of third switch terminals are connected between the second junction and a third junction. A fourth solid-state switch having a pair of fourth switch terminals and a fourth control terminal wherein the pair of fourth switch terminals are connected between the third junction and a ground. A capacitor coupled between the first junction and the third junction, and an inductor coupled between the second junction and a load. Wherein the first, second, third and fourth solid-state switches regulate a voltage at the load by repetitively (1) charging the capacitor causing an increase in current flow in the inductor followed by a decrease in current flow in the inductor and before the current flow in the inductor reaches a first level, and (2) discharging the capacitor causing an increase in current flow in the inductor followed by a decrease in current flow in the inductor and before the current flow in the inductor reaches a second level, repeating (1).

In some embodiments the first and the second levels are substantially 0 amperes. In various embodiments a first preflux condition is generated in the inductor before (1). In some embodiments a second preflux condition is generated in the inductor before (2). In various embodiments when repetitively performing (1) and (2) a continuous current flows through the inductor. In some embodiments in response to a voltage at the load being above a predetermined threshold voltage the controller allows the current flow in the inductor to stop in (1). In various embodiments the first, second, third and fourth solid-state switches are disposed on a unitary semiconductor die that is attached to a substrate having a plurality of contacts for forming electrical connections to a circuit board.

In some embodiments a method of operating a power conversion circuit to deliver power to a load comprises supplying power to the power conversion circuit with a power supply connected to a first terminal. The power conversion circuit comprises a first solid-state switch having a pair of first switch terminals and a first control terminal wherein the pair of first switch terminals are connected between the first terminal and a first junction. A second solid-state switch having a pair of second switch terminals and a second control terminal wherein the pair of second switch terminals are connected between the first junction and a second junction. A third solid-state switch having a pair of third switch terminals and a third control terminal wherein the pair of third switch terminals are connected between the second junction and a third junction. A fourth solid-state switch having a pair of fourth switch terminals and a fourth control terminal wherein the pair of fourth switch terminals are connected between the third junction and a ground. A capacitor coupled between the first junction and the third junction, and an inductor coupled between the second junction and the load and a controller that controls on and off states of the first, second, third and fourth solid-state switches. The on and off states of the first, the second, the third and the fourth solid-state switches are controlled such that a voltage at the load is regulated by repetitively (1) charging the capacitor causing an increase in current flow in the inductor followed by a decrease in current flow in the inductor and before the current flow in the inductor reaches a first level, (2) discharging the capacitor causing an increase in current flow in the inductor followed by a decrease in current flow in the inductor and before the current flow in the inductor reaches a second level, repeating (1).

To better understand the nature and advantages of the present invention, reference should be made to the following description and the accompanying figures. It is to be understood, however, that each of the figures is provided for the purpose of illustration only and is not intended as a definition of the limits of the scope of the present invention. Also, as a general rule, and unless it is evident to the contrary from the description, where elements in different figures use identical reference numbers, the elements are generally either identical or at least similar in function or purpose.

DETAILED DESCRIPTION

Certain embodiments of the present invention relate to power regulator circuits. While the present invention can be useful for a wide variety of power regulator circuits, some embodiments of the invention are particularly useful for power regulator circuits that can operate at relatively high frequencies and high efficiencies enabling the circuits to be completely contained on a unitary integrated circuit (IC) device adjacent to the load that it powers, as described in more detail below.

Figure 1:
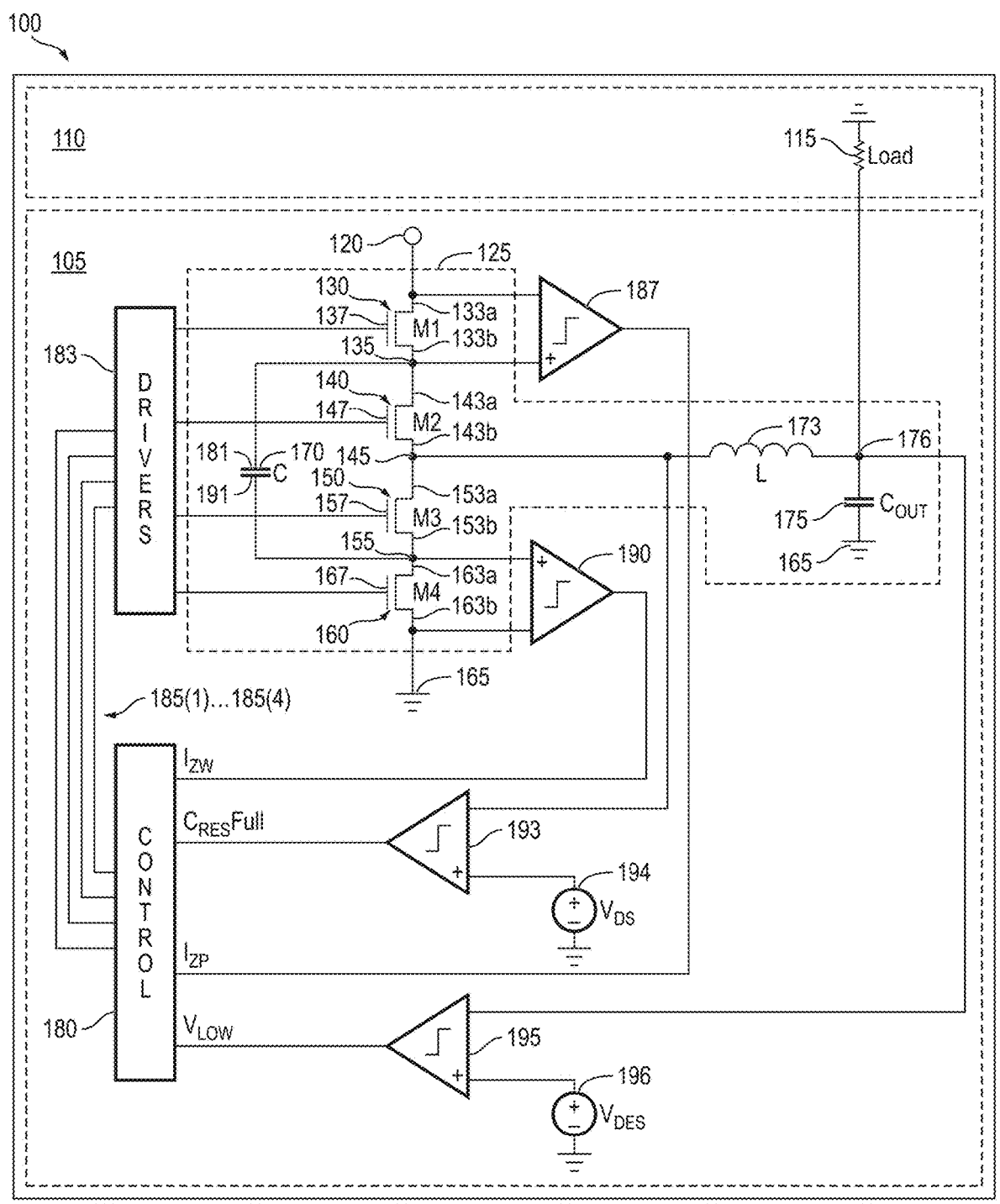
FIG. 1 is a schematic of a unitary die containing a power regulator portion and a load portion according to an embodiment of the invention.

Now referring to FIG. 1 a non-limiting example block diagram of a power regulator circuit and a load integrated on a unitary IC device is illustrated. Unitary IC 100 may have a power regulator portion 105 and a load portion 110 monolithically integrated. Load portion 110 may perform any function including, but not limited to, a central processing unit, a graphics processing unit, an application processing unit, a display driver, or other function. Load portion 110 may be illustrated schematically by a load resistor 115.

Power regulator portion 105 may be configured to receive an input voltage from a first terminal 120 and supply a regulated output voltage to load 115. Power regulator portion 105 may have a switched regulation circuit 125 that is operated and controlled by one or more peripheral circuits, as discussed in more detail below.

Switched regulation circuit 125 may comprise four solid-state switches connected in series, an LC circuit and an output capacitor. More specifically, power regulation circuit 125 may be supplied with DC power through first terminal 120. A first solid-state switch 130 has a pair of first switch terminals 133a, 133b connected between first terminal 120 and a first junction 135, respectively. First solid-state switch 130 may also have a first control terminal 137 that may be used to transition the first solid-state switch between an on state and an off state, as discussed in more detail below.

A second solid-state switch 140 has a pair of second switch terminals 143a, 143b connected between first junction 135 and a second junction 145, respectively. Second solid-state switch 140 further has a second control terminal 147. A third solid-state switch 150 has a pair of third switch terminals 153a, 153b connected between second junction 145 and a third junction 155, respectively. Third solid-state switch further has a third control terminal 157. Fourth solid-state switch 160 has a pair of fourth switch terminals 163a, 163b connected between third junction 155 and a ground 165, respectively. Fourth solid-state switch 160 further has a fourth control terminal 167. An LC circuit includes a capacitor 170 connected between first junction 135 and third junction 155, and an inductor 173 connected between second junction 145 and load 115. In further embodiments, inductor 173 may be in series with capacitor 170. An output capacitor 175 is connected between inductor 173 and load 115 and coupled to ground 165. An output node 176, to which inductor 173, output capacitor 175 and load 115 are connected may be used to monitor an output voltage (Vout) of switched regulation circuit 125. For ease of identification, labels M1, M2, M3 and M4 may be used throughout this disclosure to identify first solid-state switch 130, second solid-state switch 140, third solid-state switch 150 and fourth solid-state switch 160, respectively. In some embodiments, the inductor 173 can be located between the capacitor 170 and either node 135 or node 155.

A controller is configured to receive inputs from the switched regulation circuit and control the operation of the solid state switches to provide a substantially constant output, as discussed in more detail below. Controller 180 may be coupled to driver circuits 183 with control lines 185(1) . . . 185(4) such that each control line controls the operation of one solid-state switch. In one embodiment, controller 180 may transmit high and low control signals through control lines 185(1) . . . 185(4) to operate a corresponding driver circuit 183. Driver circuits 183 may be coupled to first, second, third and fourth control terminals 137, 147, 157, 167, respectively of first, second, third and fourth solid state switches, 130, 140, 150, 160, respectively. Driver circuits 183 may receive commands from controller 180 and control the operation of first, second, third and fourth solid state switches, 130, 140, 150, 160 respectively by sending signals through first, second, third and fourth control terminals 137, 147, 157, 167, respectively. Driver circuits 183 can have other functions, for example, converting the voltage level of the control circuitry to voltages for the drivers.

In some embodiments, controller 180 may regulate the voltage at output node 176 by controlling the first, second, third and fourth solid state switches, 130, 140, 150, 160, respectively, by repetitively (1) charging capacitor 170 causing a current to flow in inductor 173 and (2) discharging the capacitor causing current to flow in the inductor, as discussed in more detail below.

In some embodiments, one or more peripheral circuits may be employed individually or in combination with each other to aid controller 180 in operating switched regulation circuit 125. In one embodiment, a first comparator 187 may be connected from first terminal 120 to a first side 181 of capacitor 170 and be configured to compare the respective voltage levels. By comparing voltage levels, first comparator 187 may monitor the current flowing through first solid-state switch 130 (i.e., zero volts across the comparator equates to zero current flowing through first solid state switch). Similarly, second comparator 190 may be connected between ground 165 and a second side 191 of capacitor 170 and be configured to detect current flowing through fourth solid-state switch 160. Thus, first and second comparators 187, 190, respectively may be used to monitor current flowing through inductor 173 when first or fourth solid-state switches, 130, 160, respectively, are coupled in series with the inductor, as described in further detail below. In some embodiments, first comparator 187 may be connected between terminals 120 and 145 to detect current flowing through switches 130 and 140 (e.g., to detect preflux current). In some embodiments, second comparator 190 may be connected between terminals 145 and 165 to detect current flowing through switches 150 and 160 (e.g. to detect softbrake current).

In another embodiment a third comparator 193 may be connected between second junction 145 and a first voltage source 194. In one embodiment first voltage source 194 may be a ground connection (i.e., having a potential of 0 volts). In some embodiments, a voltage level of first voltage source 194 may be used to create a timing offset for controller 180 to accommodate for delays in switch actuation. Third comparator 193 may be used to detect the voltage at second junction 145 when it is equivalent to the voltage of first voltage source 194 Similarly, fourth comparator 195 may be connected between output node 176 (Vout) and a second voltage source 196 such that it notifies controller 180 when it detects that Vout is equivalent to the second voltage source. Second voltage source 196 may also be adjusted to compensate for switch actuation delays. The combination of first, second, third and fourth comparators, 187, 190, 193, 195, respectively, may be used to aid controller 180 in detecting the current in inductor 173, the voltage across capacitor 170, and the voltage at output node 176 (Vout). In other embodiments different methods may be used to detect voltages and currents in switched regulation circuit 125 without departing from this invention. For example, in one embodiment a voltage across inductor 173 may be used to detect current in the inductor.

Although FIG. 1 illustrates a unitary IC 100 with all components integrated within the unitary IC, other embodiments may have the components disposed on more than one IC, while further embodiments may have one or more components that are not on an IC and disposed on circuitry adjacent the IC. For example, one embodiment may have output capacitor 175 or inductor 173 disposed adjacent one or more ICs. In other embodiments, one or more switches or drivers or control circuits may be on a separate IC.

Figure 2:
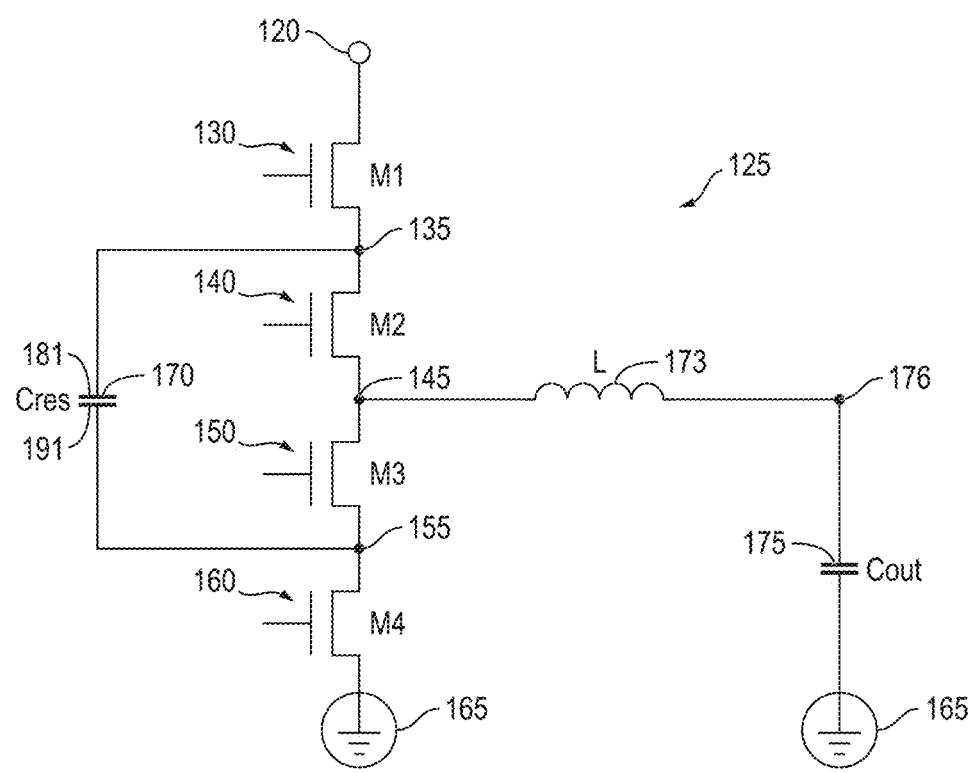
FIG. 2 is a schematic of the switched regulation circuit that has been removed from the power regulator portion of the schematic in FIG. 1.

Now referring to FIG. 2, for simplicity of illustration, switched regulation circuit 125 has been removed from power regulator portion 105 of unitary IC device 100 shown in FIG. 1. Switched regulation circuit 125 will be used to show the repetitive switching sequence used by the power regulator to control the voltage at output node 176 (Vout) delivered to load 115 (see FIG. 1).

Figure 3:
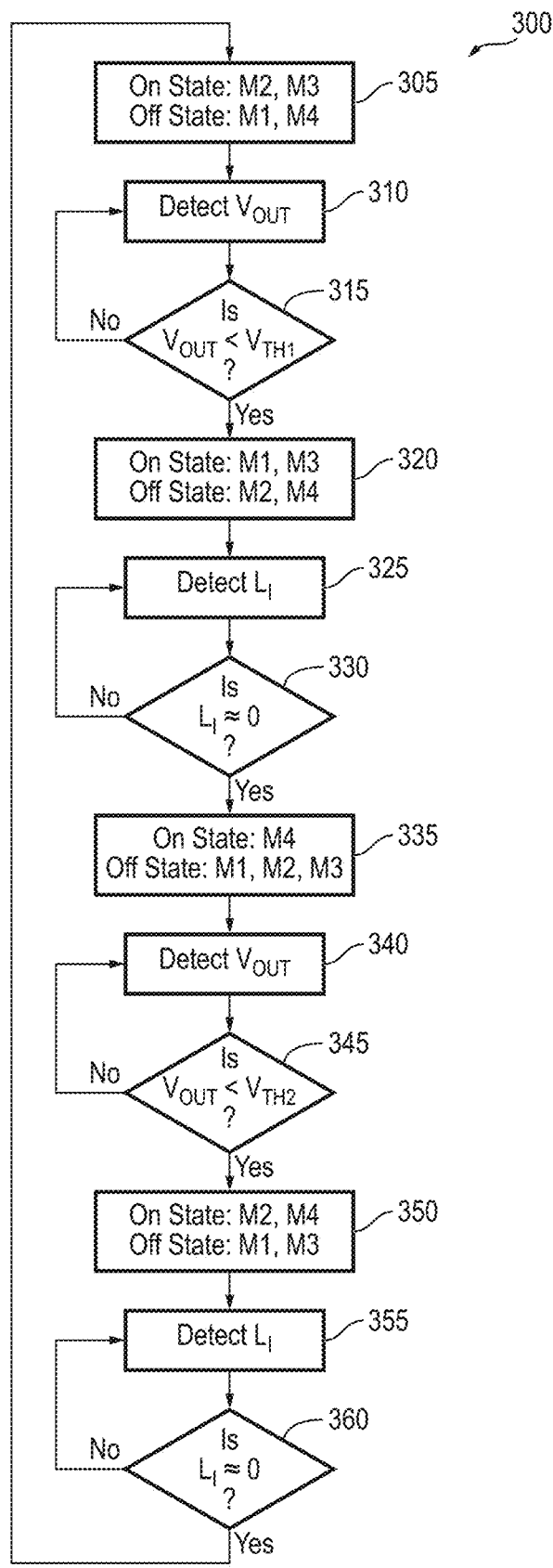
FIG. 3 is a flowchart of a repetitive switching sequence for the switched regulation circuit in FIG. 2 according to an embodiment of the invention.
Figure 6:
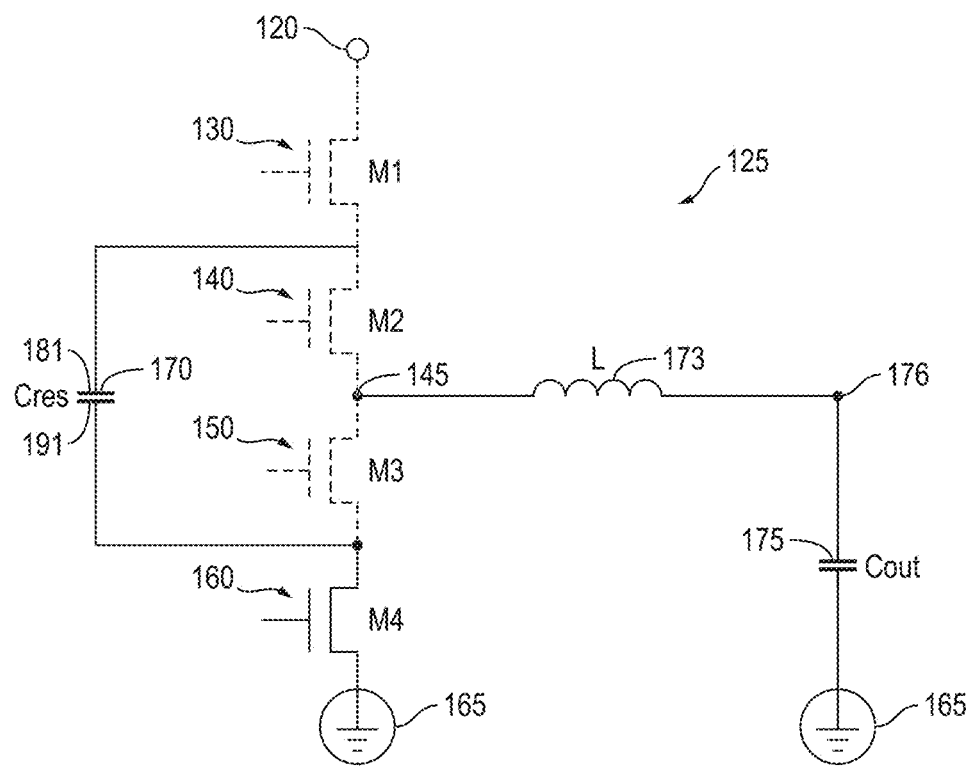
FIG. 6 is a schematic of the switched regulation circuit shown in FIG. 2 in a particular switch configuration according to the flowchart in FIG. 3.
Figure 7:
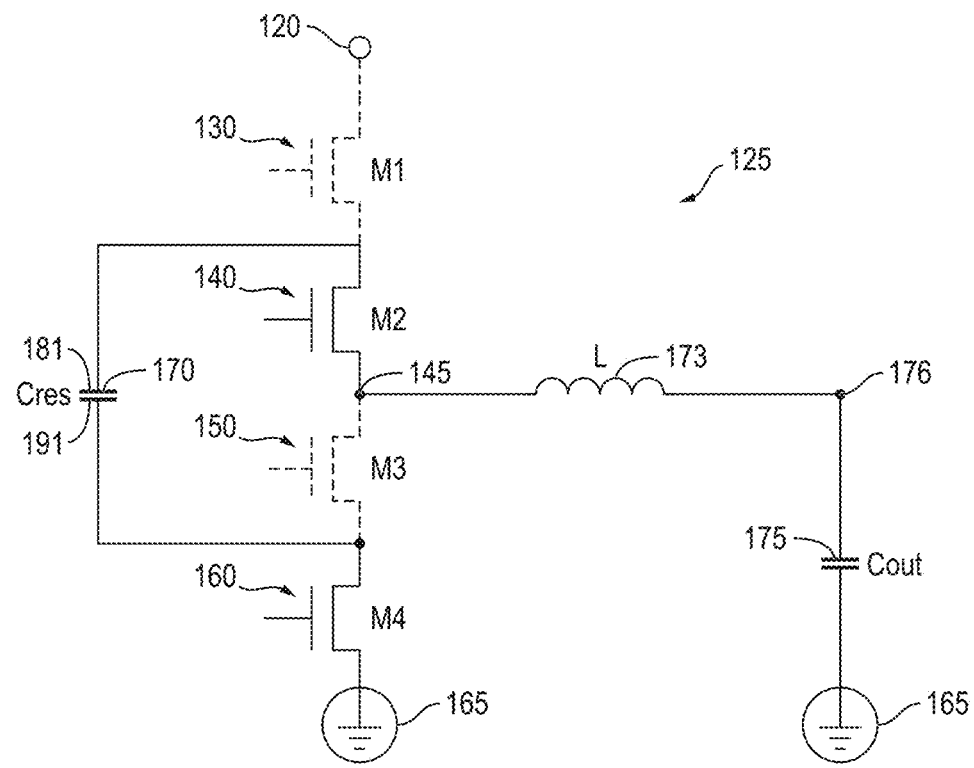
FIG. 7 is a schematic of the switched regulation circuit shown in FIG. 2 in a particular switch configuration according to the flowchart in FIG. 3.
Figure 8:
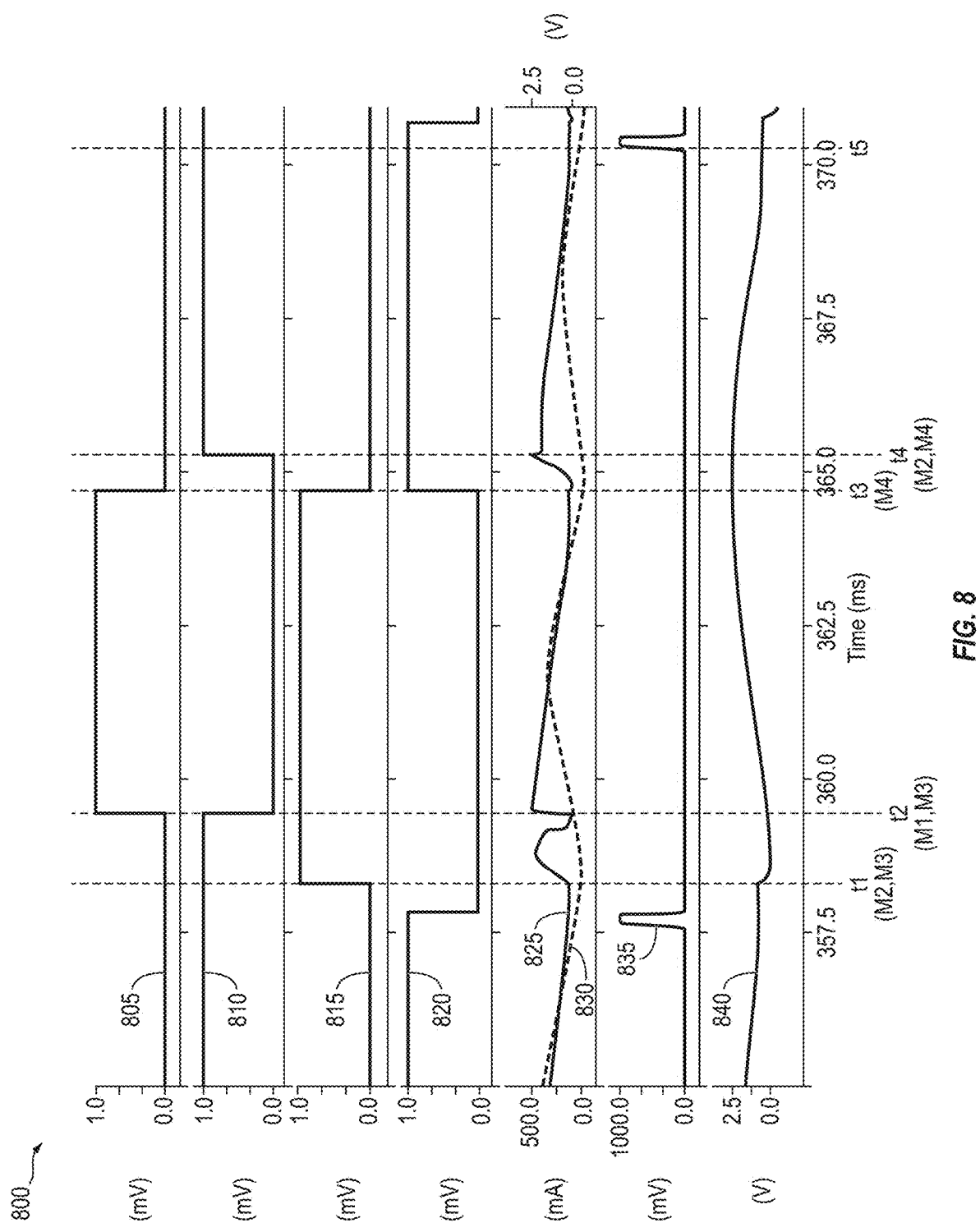
FIG. 8 is a timing diagram of voltages and currents within the switched regulation circuit of FIG. 2 according to the switching sequence in FIG. 3.

Now referring simultaneously to FIGS. 3-8 a first embodiment of a switching sequence and timing diagram for switched regulation circuit 125 is illustrated. FIG. 3 identifies four different solid-state switch configurations, the order in which the solid-state switches are turned on and off and the decisions between each step. FIGS. 4-7 illustrate simplified circuit schematics of each of the four different solid-state switch configurations. Solid-state switches in the on state are depicted with solid lines and solid-state switches that are in the off state are depicted with dashed lines. FIG. 8 illustrates an example timing diagram, showing the control signals delivered to each of the four solid-state switches as well as the voltage at second junction 145, the current within inductor 173, an inductor current comparator output and the voltage across capacitor 173. The switching sequence illustrated in FIGS. 3-8 is only an example and other sequences, timings and configurations are within the scope of this disclosure.

Figure 4:
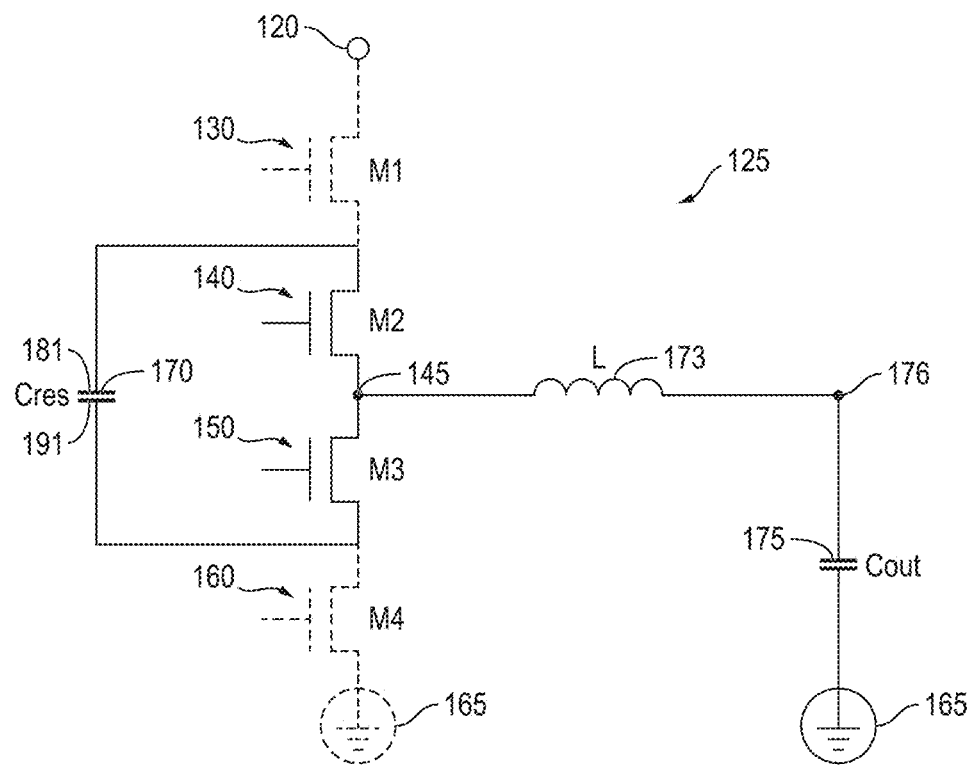
FIG. 4 is a schematic of the switched regulation circuit shown in FIG. 2 in a particular switch configuration according to the flowchart in FIG. 3.

Now referring to FIG. 3, a first switching sequence 300 having sequential steps 305 through 360 is illustrated. In step 305, second and third solid-state switches M2, M3, respectively, are controlled to be in an on state and first and fourth solid-state switches M1, M4 are controlled to be in an off state. A simplified schematic of switched regulation circuit 125 in step 305 is illustrated in FIG. 4. Second and third solid-state switches 140, 150, respectively are in an on state (solid lines) and first and fourth solid-state switches 130, 160, respectively are in an off state (dashed lines). Therefore, capacitor 170 is in a shorted condition, allowing any residual charge within the capacitor to dissipate such that the capacitor is discharged.

Now referring to timing diagram 800 in FIG. 8, first step 305 occurs at time t1. Trace 805 illustrates a control voltage applied to first solid-state switch 130. In the particular embodiment depicted in diagram 800, switches are turned on when approximately 1 volt is applied. At time t1 trace 805 is at approximately 0 volts thus first solid-state switch 130 is off. Trace 810 illustrates a control terminal voltage applied to second solid-state switch 140. At time t1 trace 810 is at approximately 1 volt thus second solid-state switch is on. Trace 815 illustrates a control terminal voltage applied to third solid-state switch 150. At time t1 trace 815 transitions to approximately 1 volt thus third solid-state switch 150 transitions from off to on. Trace 820 illustrates a control terminal voltage applied to fourth solid-state switch 160. At time t1 trace 820 is at approximately 0 volts thus fourth solid-state switch is off.

Trace 825 illustrates a voltage at second junction 145. At time t1, capacitor 170 is shorted. Trace 830 illustrates current through inductor 173. At time t1 inductor 173 is decoupled from the remainder of switched regulation circuit 125 thus the current in inductor 173 is zero. Trace 835 illustrates a comparator output corresponding to a zero current condition in inductor 173, as discussed in more detail below. Trace 840 illustrates the voltage across capacitor 170. At time t1 capacitor 170 is shorted causing the voltage across capacitor 173 to decrease as the capacitor is discharged.

Now referring back to FIGS. 3 and 4, after the controller sets the solid-state switches to their respective states identified in step 305, it advances to step 310 were it detects the voltage at output node 176 (Vout). In some embodiments Vout may be detected using comparator 195 (see FIG. 1) as discussed above, or by any other method. Advancing to step 315 the controller may detect if the voltage at output node 176 has decreased below a first threshold voltage ($V_{TH1}$). If Vout remains above $V_{TH1}$ then the controller continues to detect Vout (i.e., returns to step 310) until Vout drops below $V_{TH1}$. In some embodiments the controller may cyclically detect Vout then compare it to $V_{TH1}$, while in other embodiments the controller may respond to a signal, such as from a comparator, that Vout has decreased below $V_{TH1}$. Myriad methods may be used to detect Vout, compare it to $V_{TH1}$ and notify the controller.

Figure 5:
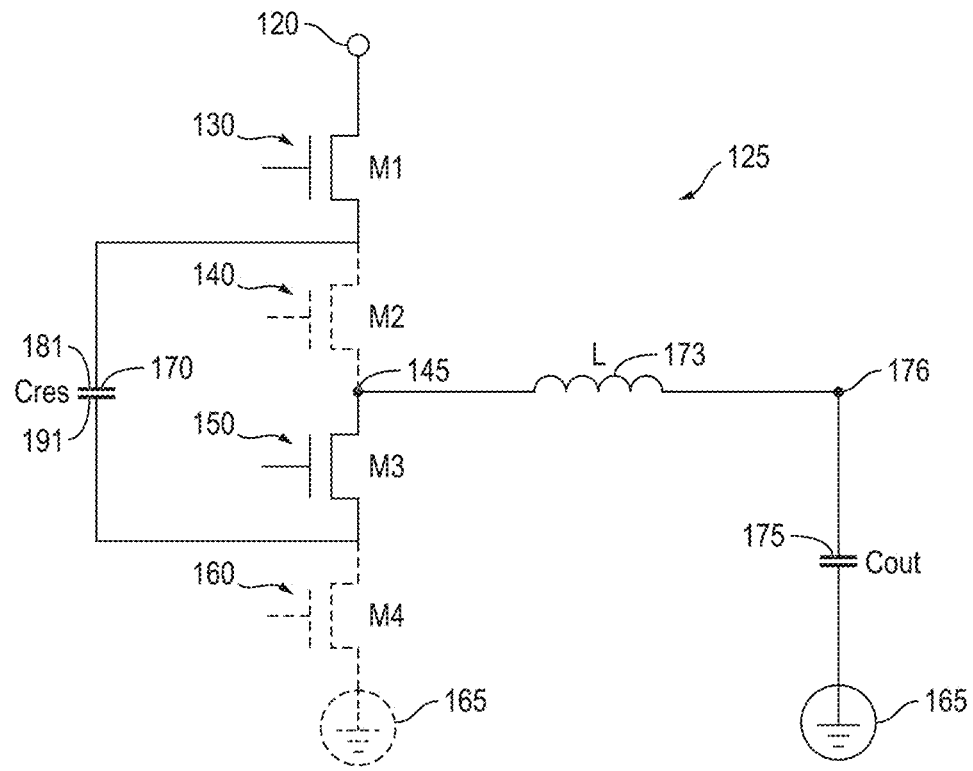
FIG. 5 is a schematic of the switched regulation circuit shown in FIG. 2 in a particular switch configuration according to the flowchart in FIG. 3.

Now referring back to FIG. 3, step 315, once Vout drops below $V_{TH1}$ the controller advances to step 320 where third solid-state switch M3 remains on while first solid-state switch M1 is turned on simultaneously with turning second solid-state switch M2 off. Thus, first and third solid-state switches, M1, M3, respectively, are on while second and fourth solid-state switches M2, M4, respectively, are off. A simplified schematic of switched regulation circuit 125 in step 320 is illustrated in FIG. 5. In this state the voltage at first terminal 120 (Vin) is applied directly to second junction 145. Capacitor 170 was fully discharged in the previous step and now begins to charge. Capacitor 170 charges with a time constant set by capacitor 170 and inductor 173 values. Further, as capacitor 170 begins to charge, current flow in inductor 173 increases as the voltage between 145 and the output is positive.

Step 320 is illustrated in timing diagram 800 (see FIG. 8) at time t2. Now referring simultaneously to FIGS. 5 and 8, at time t2, first solid-state switch 130 (i.e., trace 805) turns on almost simultaneously with second solid-state switch 140 (i.e., trace 810) turning off. The voltage at second junction 145 (i.e., trace 825) increases rapidly to the voltage at first terminal 120 (Vin), in this application (or embodiment) approximately 2 volts. Between time t1 and t2 the voltage at second junction 145 may fluctuate At time t2, current in inductor 173 (i.e., trace 830) begins to increase. As capacitor 170 becomes charged (i.e., trace 840 approaches 2 volts), Voltage at 145 start to decrease. When the voltage at 145 goes below the load voltage 176, the current in inductor 173 (i.e., trace 830) starts to decrease. Thus, in step 320 capacitor 170 becomes charged, causing a current to flow in inductor 173, and increasing the voltage at output node 176 (Vout). The controller then proceeds to step 325 (see FIG. 3).

In step 325, the current in inductor 173 ($L_1$) is detected. In some embodiments the current may be detected as illustrated in FIG. 1 with comparator 187. In one embodiment comparator 187 monitors current flow through first solid-state switch 130 by comparing a voltage difference between first terminal 120 and first side 181 of capacitor 170. As the voltage difference decreases, the current commensurately decreases in both first solid-state switch 130 and inductor 173. Referring now to step 330 in FIG. 3, once current in inductor 173 is approximately equal to zero, the controller proceeds to step 335 where first and third solid-state switches M1, M3, respectively, turn off and fourth solid-state switch M4 turns on while second solid-state switch M2 remains off. As discussed above, since the transition to step 335 only occurs when the current in inductor 176 is approximately zero, the transition to step 335 may employ zero current switching of first solid-state switch M1. Zero current switching occurs when the current through the solid-state switch is approximately zero, before changing the state of the switch. This reduces switching losses, reduces input supply noise, and improves the efficiency of switched regulation circuit 125, as discussed in more detail below.

Continuing to refer to step 335 in FIG. 3, in some embodiments the switching transitions may occur simultaneously while in other embodiments there may be slight delays between switch transitions. A simplified schematic of switched regulation circuit 125 in step 335 is illustrated in FIG. 6. Fourth solid-state switch 160 ties second side 191 of capacitor 170 to ground, however first side 181 of the capacitor is left floating such that the capacitor remains charged. This configuration is essentially an off state, where the system is substantially at steady-state. Other embodiments may have a different off state configuration. In one embodiment, all solid-state switches may be in an off position, while in further embodiments third solid-state switch 150 may be the only switch in an on state which connects capacitor 170 to inductor 173. In another embodiment both first and fourth solid-state switches 130, 160, respectively may be on simultaneously. Other off state solid-state switch configurations are within the scope of this disclosure.

Step 335 of FIG. 3 is illustrated in timing diagram 800 of FIG. 8, at time t3. Now referring simultaneously to FIGS. 6 and 8, at time t3 first and third solid-state switches, 130, 150, respectively, turn off and fourth solid-state switch 160 turns on while second solid-state switch 140 remains off. After the switching transitions, second junction 145 (i.e., trace 825) is disconnected from the solid-state switches and its voltage starts to increase. Capacitor 170 (i.e., trace 840) remains charged and the current in inductor 173 (i.e., trace 830) remains near zero. In step 340 the voltage at output node 176 (Vout) may be detected with comparator 195 (see FIG. 1) as discussed above in step 310. In other embodiments, Vout may be detected using a different method. As shown in step 345, the controller advances to step 350 when Vout drops below a second threshold voltage ($V_{TH2}$).

Now referring to FIG. 3, step 350, fourth solid-state switch M4 remains on and second solid-state switch M2 is turned on while first and third solid-state switches M1, M3, respectively, remain off. A simplified schematic of switched regulation circuit 125 in step 350 is illustrated in FIG. 7. Capacitor 170 is connected between inductor 173 and ground 165, allowing the charge stored in the capacitor to discharge through the inductor to load 115 (see FIG. 1). As capacitor 170 begins to discharge (with a time constant set by capacitor 170 and inductor 173), current in inductor 173 starts to increase and voltage at output node 176 (Vout) increases. This condition is illustrated in timing diagram 800 in FIG. 8 at time t4.

Now simultaneously referring to FIGS. 7 and 8, at time t4 second solid-state switch 140 (i.e., trace 810) turns on. The voltage at second junction 145 (i.e., trace 825) makes an adjustment to approximately 2 volts as it is connected to fully charged capacitor 170. As capacitor 170 resonates with inductor 173, it discharges (i.e., trace 840) causing current to increase in inductor 173 (i.e., trace 830). This causes the voltage at Vout to increase. As the charge in capacitor 170 is reduced, current in inductor 173 decreases (i.e., trace 830). After configuring the solid-state switches, controller advances to steps 355 and 360 (see FIG. 3).

In step 355, the current in inductor 173 is detected. In some embodiments the current may be detected as illustrated in FIG. 1 with comparator 190. In further embodiments, comparator 190 (see FIG. 1) may be used to monitor the current through fourth semiconductor switch 160 and indirectly through inductor 173, by detecting a voltage differential between ground 165 and second side 191 of capacitor 170. For example, at time t5 in timing diagram 800 in FIG. 8, trace 835 illustrates a comparator output corresponding to a zero current condition in inductor 173. In other embodiments different methods may be used to detect current in inductor 173.

Referring now simultaneously to FIGS. 3 and 7, in step 360, once the current in inductor 173 is approximately equal to zero, the controller proceeds back to step 305, where third solid-state switch M3 is turned on and second solid-state switch M2 remains on while first solid-state switch M1 remains off and fourth solid-state switch M4 is turned off. Thus, M2 and M3 are on while M1 and M4 are off. This configuration shorts capacitor 170, repeating the entire switching sequence 300. As discussed above, since the current in inductor 173 and fourth solid-state switch M4 is at or near zero during the transition from step 360 to 305, zero current switching methods may be used to decrease switching losses, reduce input supply noise and improve efficiency, as discussed in more detail below.

In the particular switching sequence illustrated in FIG. 3, each solid-state switch turns on and off only once during each repetitive switching cycle. Such a sequence may enable improved efficiency by minimizing switching losses. In other embodiments, different switching configurations and sequences may be used where one or more switches may be turned on and off more than once.

As discussed above in FIG. 1, power regulator portion 105 and a load portion 110 may be monolithically integrated on unitary IC 100. In one embodiment unitary IC 100 may comprise silicon and first, second, third and fourth solid-state switches 130, 140, 150, 160 may be junction gate field effect devices (JFETs) while in other embodiments they may be metal-oxide semiconductor field-effect transistors (MOSFETs), bi-polar devices or any other type of solid-state transistor. In further embodiments other materials may be used for unitary IC 100 such as silicon-germanium, siliconcarbide, gallium-nitride, gallium-arsenide and other materials. In one embodiment, unitary IC 100 may use a 28 nm and 40 nm fabrication process with an on die inductor in the range of 1-5 nH and an on die capacitor in the range of 100-300 pF, resulting in an on-time in the range of 1-5 ns.

In further embodiments, although solid-state switches 130, 140, 150 and 160 may be referred to in singular form, in some embodiments one or more of them may comprise more than one switch. More specifically, in one embodiment first solid state switch M1 may be made from two solid-state switches connected in series. In other embodiments one or more of the solid-state switches may comprise two or more solid-state switches that operate in conjunction with one another.

Figure 9:
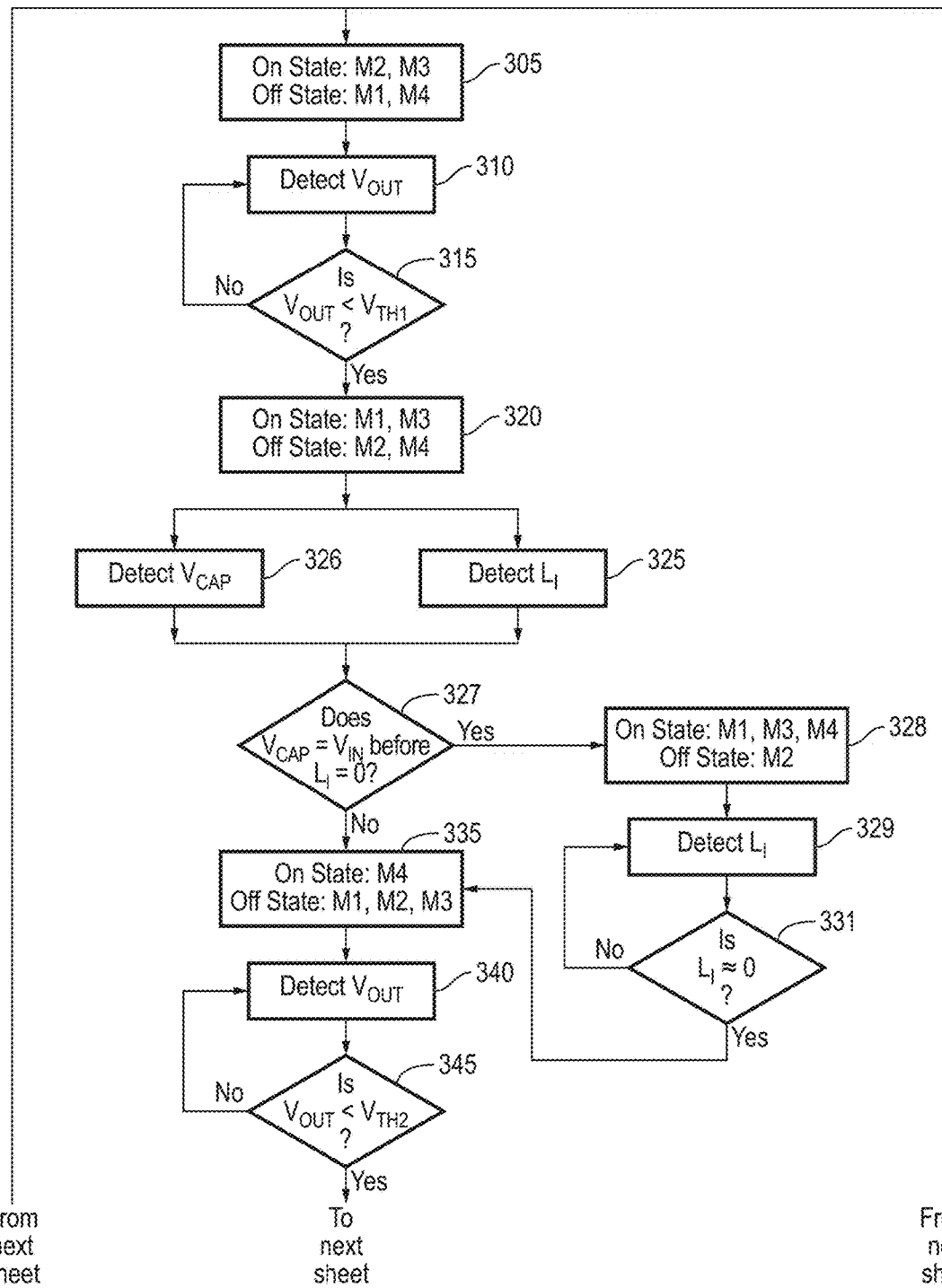
FIG. 9 is a is a flowchart of a repetitive switching sequence for the switched regulation circuit in FIG. 3 according to an embodiment of the invention.
Figure 9:
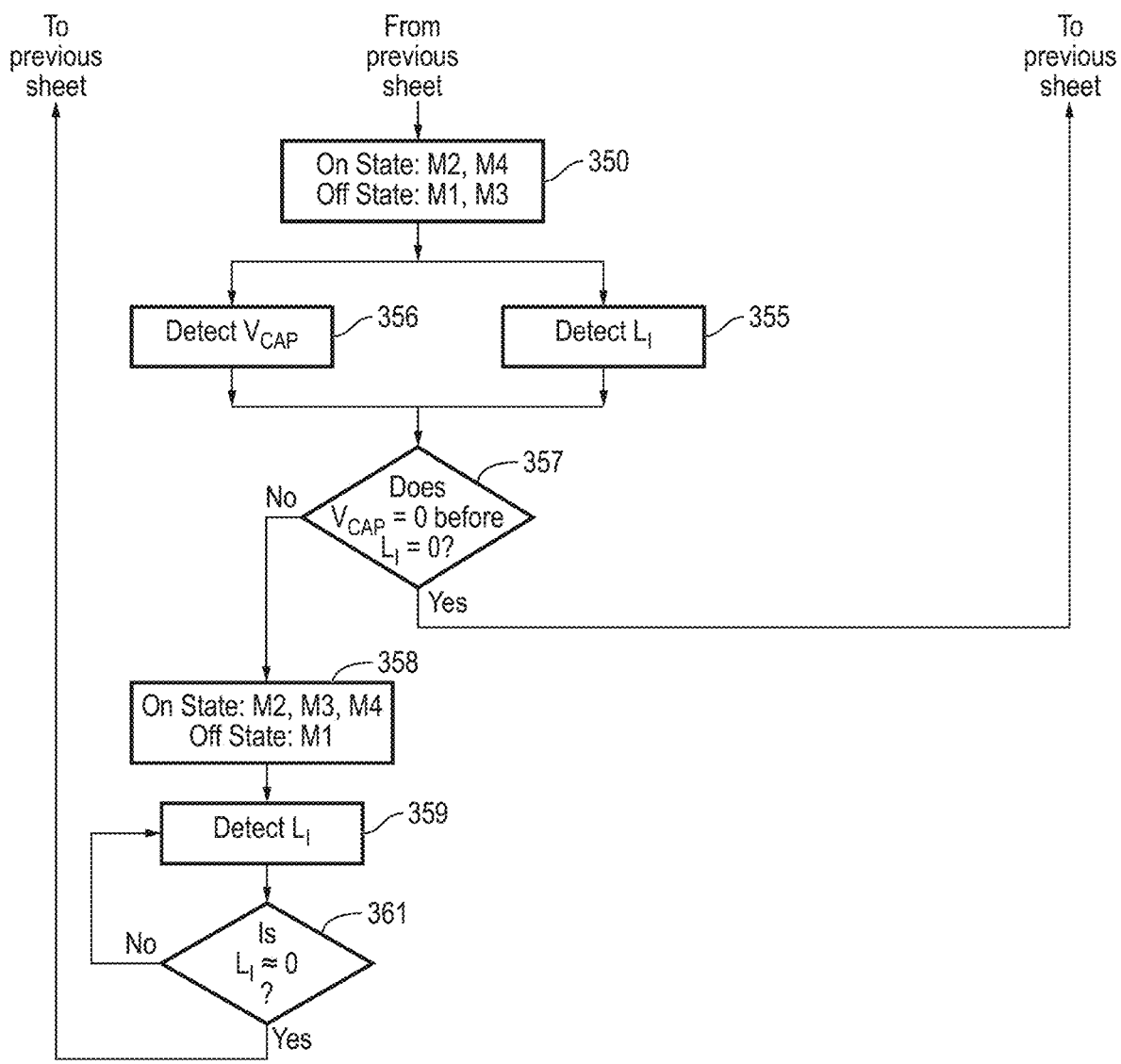
Figure 10:
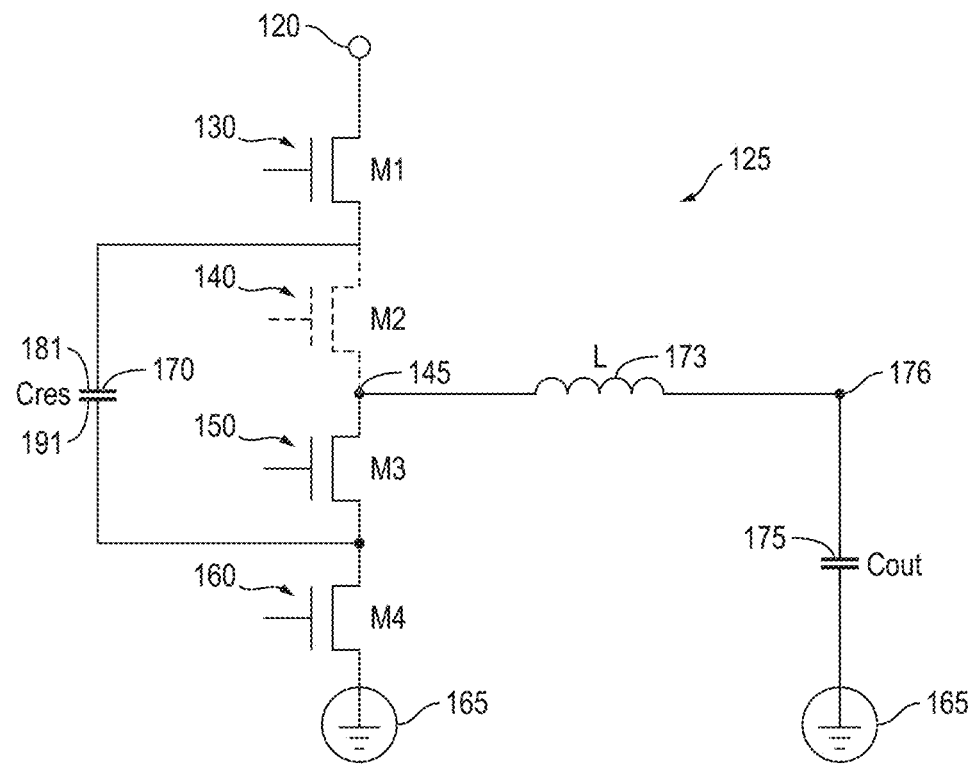
FIG. 10 is a schematic of the switched regulation circuit shown in FIG. 2 in a particular switch configuration according to the flowchart in FIG. 9.
Figure 11:
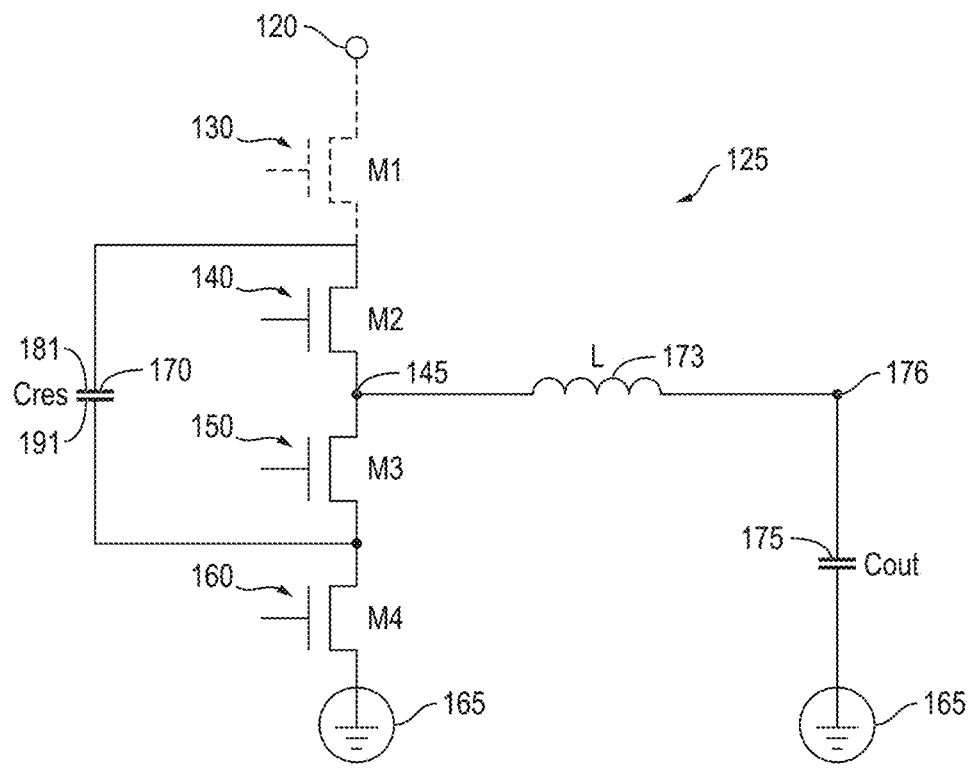
FIG. 11 is a schematic of the switched regulation circuit shown in FIG. 2 in a particular switch configuration according to the flowchart in FIG. 9.

Now referring to FIG. 9 another embodiment of a sequential switching sequence 900 is illustrated. Sequence 900 has many similar steps as sequence 300 in FIG. 3 such as steps 305-325 and 335-355. Thus steps that are the same between the sequences use the same reference numbers and the same schematics in FIGS. 4-7. However, sequence 900 has added steps including two added switch configurations, steps 328 and 358, the schematics for which are illustrated in FIGS. 10 and 11. Reference will now be made simultaneously to FIGS. 4-7 and 9-11.

Now referring to FIG. 9, a second switching sequence 900 having sequential steps 305 through 361 is illustrated. In step 305, second and third solid-state switches M2, M3, respectively, are controlled to be in an on state and first and fourth solid-state switches M1, M4 are controlled to be in an off state. A simplified schematic of switched regulation circuit 125 in step 305 is illustrated in FIG. 4. Second and third solid-state switches 140, 150, respectively are in an on state (solid lines) and first and fourth solid-state switches 130, 160, respectively are in an off state (dashed lines). Therefore, capacitor 170 is in a shorted condition, allowing any residual charge within the capacitor to dissipate such that the capacitor is discharged.

Now referring back to FIGS. 3 and 4, after the controller sets the solid-state switches to their respective states identified in step 305, it advances to step 310 were it detects the voltage at output node 176 (Vout). In some embodiments the voltage at output node 176 (Vout) may be detected using comparator 195 (see FIG. 1) as discussed above, or by any other method. Advancing to step 315 the controller may detect if the voltage at output node 176 has decreased below a first threshold voltage ($V_{TH1}$). If Vout remains above $V_{TH1}$ then the controller continues to detect Vout (i.e., returns to step 310) until Vout drops below $V_{TH1}$. In some embodiments the controller may cyclically detect Vout then compare it to $V_{TH1}$, while in other embodiments the controller may respond to a signal, such as from a comparator, that Vout has decreased below $V_{TH1}$ and respond accordingly. Myriad methods may be used to detect Vout, compare it to $V_{TH1}$ and notify the controller.

Now referring back to FIG. 9, step 315, once Vout drops below $V_{TH1}$ the controller advances to step 320 where third solid-state switch M3 remains on while first solid-state switch M1 is turned on simultaneously with turning second solid-state switch M2 off. Thus, first and third solid-state switches, M1, M3, respectively, are on while second and fourth solid-state switches M2, M4, respectively, are off. A simplified schematic of switched regulation circuit 125 in step 320 is illustrated in FIG. 5. In this state the voltage at first terminal 120 (Vin) is applied directly to second junction 145. Capacitor 170 was fully discharged in the previous step and now begins to charge. Capacitor 170 charges with a time constant set by capacitor 170 and inductor 173 values. Further, as capacitor 170 begins to charge, current flow in inductor 173 increases then decrease.

In some embodiments, steps 325 and 326 may occur simultaneously using one or more comparators or other techniques, as discussed in more detail below. In step 325, the current in inductor 173 ($L_1$) is detected. In some embodiments this may be performed as illustrated in FIG. 1 with comparator 187. In one embodiment comparator 187 monitors current flow through first solid-state switch 130 by comparing a voltage difference between first terminal 120 and first side 181 of capacitor 170. As the voltage difference decreases, the current commensurately decreases in both first solid-state switch 130 and inductor 173. In step 326 the voltage drop across capacitor 170 ($V_{CAP}$) is detected, using one or more comparators, as discussed above. More specifically the controller is configured to continue charging the capacitor until a voltage potential on the second junction is approximately 0 volts. In step 327 the controller determines if the voltage on capacitor ($V_{CAP}$) 170 is equivalent to the voltage at (Vin) 120 before current in inductor 173 is zero. More specifically, during steps 320, 325, 326 and 327, capacitor 170 is being charged and once it reaches full charge (i.e., voltage on capacitor 170 is equivalent to the voltage at (Vin) 120 the controller determines if there is still current flowing in inductor 170. If there is still current in inductor 170, the controller proceeds to step 328, however it there is no current in the inductor then it proceeds to step 335.

Proceeding now to step 328, assuming the condition $L_1>0$ when $V_{CAP}$=Vin, first and third solid-state switches M1, M3 remain on while fourth solid-state switch M4 is turned on simultaneously with turning second solid-state switch M2 off. Thus, first, third and fourth solid-state switches, M1, M3 and M4, respectively, are on while second solid-state switch M2 is off. In some embodiments, M4 may be turned on slowly so that the current in M1 is slowly reduced so as to reduce the amount of supply noise. A simplified schematic of switched regulation circuit 125 in step 328 is illustrated in FIG. 10. In this state inductor 173 is shorted to ground 165, resulting in a discharge of any remaining current within it. After configuring the solid-state switches, controller advances to steps 329 and 331 (see FIG. 9).

In step 329, the current in inductor 173 is detected. In some embodiments the current may be detected as illustrated in FIG. 1 with comparator 190. In some embodiments, comparator 190 (see FIG. 1) may be used to monitor the current through fourth semiconductor switch 160 and indirectly through inductor 173, by detecting a voltage differential between ground 165 and second side 191 of capacitor 170. In other embodiments different methods may be used to detect current in inductor 173.

Referring now simultaneously to FIGS. 3 and 7, in step 331, once the current in inductor 173 is approximately equal to zero, the controller proceeds to step 335. In summary, steps 328, 329 and 331 discharge the remaining current in inductor 170 and transition to the waiting state in step 335.

Referring now back to step 327, assuming condition $L_1=0$ (i.e., there is no current in inductor 170), instead of going to step 328, the controller goes directly to step 335 where first and third solid-state switches M1, M3, respectively, turn off and fourth solid-state switch M4 turns on while second solid-state switch M2 remains off. Thus, M4 is on while M1, M2 and M3 are off. As discussed above, since the transition to step 335 only occurs when the current in inductor 176 is approximately zero, the transition to step 335 may employ zero current switching of first solid-state switch M1. Zero current switching occurs when the current through the solid-state switch is approximately zero, before changing the state of the switch. This reduces switching losses, reduces input supply noise and improves the efficiency of switched regulation circuit 125, as discussed in more detail below.

Continuing to refer to step 335 in FIG. 9, in some embodiments the switching transitions may occur simultaneously while in other embodiments there may be slight delays between switch transitions. A simplified schematic of switched regulation circuit 125 in step 335 is illustrated in FIG. 6. Fourth solid-state switch 160 ties second side 191 of capacitor 170 to ground, however first side 181 of the capacitor is left floating such that capacitor remains charged. This configuration is essentially an off state, where the system is substantially at steady-state. Other embodiments may have a different off state configuration. In one embodiment, all solid-state switches may be in an off position, while in further embodiments third solid-state switch 150 may be the only switch in an on state which connects capacitor 170 to inductor 173. In another embodiment both first and fourth solid-state switches 130, 160, respectively may be on simultaneously. Other off state solid-state switch configurations are within the scope of this disclosure.

After the switches are configured in step 335 the controller advances to step 340 where the voltage at output node 176 (Vout) may be detected with comparator 195 (see FIG. 1) as discussed above in step 310. In other embodiments, Vout may be detected using a different method. As shown in step 345, the controller advances to step 350 when the voltage at output node 176 (Vout) drops below a second threshold voltage ($V_{TH2}$).

Now referring to FIG. 9, step 350, fourth solid-state switch M4 remains on and second solid-state switch M2 is turned on while first and third solid-state switches M1, M3, respectively, remain off. A simplified schematic of switched regulation circuit 125 in step 350 is illustrated in FIG. 7. Capacitor 170 is connected between inductor 173 and ground 165, allowing the charge stored in the capacitor to discharge through the inductor to load 115 (see FIG. 1). As capacitor 170 begins to discharge (with a time constant set by capacitor 170 and inductor 173), current in inductor 173 starts to increase and voltage at output node 176 (Vout) increases.

In some embodiments, steps 355 and 356 may occur simultaneously. After configuring the solid-state switches, the controller advances to step 355 where the current in inductor 173 is detected and 356 where the voltage drop across capacitor 170 ($V_{CAP}$) is detected, as discussed above. More specifically, in one embodiment controller may continue discharging the capacitor until a voltage potential on the second junction is approximately 0 volts. Then, in step 357 the controller determines if the voltage across capacitor ($V_{CAP}$) 170 is zero volts before current in inductor 173 is zero. More specifically, during steps 350, 355, 356 and 357, capacitor 170 is being discharged and once it reaches near zero charge the controller determines if there is still current flowing in inductor 170. If there is no current in inductor 170, the controller proceeds back to the beginning of the switching sequence, step 305. However, if there is still current in inductor 170 then the controller proceeds to step 358.

Proceeding now to step 358, assuming the condition $L_1 > 0$ when $V_{CAP} = 0$ volts (i.e. there is still current in the inductor when the capacitor is discharged), second and fourth solid-state switches M2, M4, respectively, remain on while third solid-state switch M3 is turned on and first solid-state switch M1 is off. Thus, second, third and fourth solid-state switches, M2, M3 and M4 respectively, are on while first solid-state switch M1 is off. A simplified schematic of switched regulation circuit 125 in step 358 is illustrated in FIG. 11. In this state inductor 173 is shorted to ground 165, resulting in discharge of any remaining current within it. After configuring the solid-state switches, controller advances to steps 359 and 361 (see FIG. 9).

In step 359, the current in inductor 173 is detected. In some embodiments the current may be detected as illustrated in FIG. 1 with comparator 190. In some embodiments, comparator 190 (see FIG. 1) may be used to monitor the current through fourth semiconductor switch 160 and indirectly through inductor 173, by detecting a voltage differential between ground 165 and second side 191 of capacitor 170. In other embodiments different methods may be used to detect current in inductor 173.

Referring now simultaneously to FIGS. 7 and 9, in step 361, once the current in inductor 173 is approximately equal to zero, the controller proceeds back to step 305, where third solid-state switch M3 is turned on and second solid-state switch M2 remains on while first solid-state switch M1 remains off and fourth solid-state switch M4 is turned off. Thus, M2 and M3 are on while M1 and M4 are off. This configuration shorts capacitor 170, repeating the entire switching sequence 900. As discussed above, since the current in inductor 173 and fourth solid-state switch M4 is zero during the transition from step 361 to 305, zero current switching methods may be used to decrease switching losses, reduce input supply noise and improve efficiency, as discussed in more detail below.

In the particular switching sequence illustrated in FIG. 9, each solid-state switch turns on and off only once during each repetitive switching cycle. Such a sequence may enable improved efficiency by minimizing switching losses. In other embodiments, different switching configurations and sequences may be used where one or more switches may be turned on and off more than once. Other embodiments may use switching sequences where one or more on the solid-state switches are turned on and off more than once per switching cycle.

Some embodiments may employ one or more comparators such as comparators 187, 190, 193, 195 in FIG. 1 to provide information to the controller to operate switched regulation circuit 125 (see FIG. 1). Further embodiments may use a combination of comparators and timers to operate switched regulation circuit 125. More specifically, with knowledge of certain switched regulation circuit 125 parameters reasonably accurate timers may be used in the place of comparators to trigger the controller to change switch configurations. In one embodiment, with knowledge of one or more electrical characteristics of switched regulation circuit 125, such as for example, Vin, Vout, inductance of inductor 17 or capacitance of capacitor 170, one or more timers may be used to estimate one or more electrical characteristics of the switched regulation circuit, such as for example current in inductor or voltage on capacitor, and trigger the transitions between switch configurations. In some embodiments, timers may be faster and easier to implement than comparators. In one embodiment, only one comparator may be used to look at Vout, and timers may be used for all other transitions.

Multiple circuit characteristics are discussed above and as discussed one or more of these characteristics may be used to determine when to change a state of the switches such as, but not limited to, Vcap, Vout, Vin and Li. In such embodiments the circuit characteristics may be continuously monitored and decisions may be made at particular times during each switch sequence as noted in the flow charts. Further, the waveforms shown in the timing diagrams, such as FIG. 8 are for illustration only and the actual waveforms may be different.

As discussed above, in some switching transitions zero current switching may be used. As used herein, zero current switching means that the solid-state switch may be turned off only when the current running through the switch is at or near zero. Switching losses (i.e., turning a switch off while it is conducting current or turning a switch on when it has a voltage potential across it) may be a significant contributor to power loss in the system. Thus, the use of zero current switching may result in reduced switching losses, increased frequency of operation and in some embodiments, reduced electromagnetic interference (EMI) generation, as discussed in more detail below.

Figure 12:
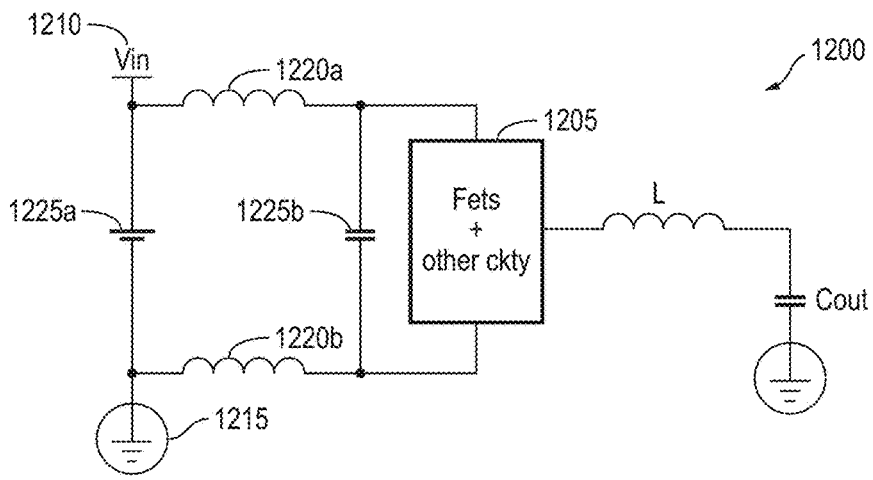
FIG. 12 is a schematic of a switched regulation circuit with parasitic elements according to an embodiment of the invention.

Now referring to FIG. 12, in some embodiments zero current switching and the solid-state switching transition speed may be reduced to suppress input supply noise (i.e., a type of EMI) as described in more detail below. FIG. 12 shows a simplified schematic 1200 of a power regulator circuit 1205 containing FETs and other circuitry that is powered by an input supply 1210 (Vin) and grounded to a ground terminal 1215. In one embodiment, power regulator circuit 1205 may be disposed on a unitary die that is encapsulated in a semiconductor package. First and second inductors 1220a, 1220b, respectively, represent the parasitic inductance associated with the power connections to power regulator circuit 1205. Parasitic inductance may result from traces on a circuit board, interconnects within an electronic package, wire bonds to a die, traces on an integrated circuit or any other conductor. Capacitor 1225a represents parasitic capacitance between the power supply lines on the supply side and capacitor 1225b represents parasitic capacitance between the input and the output power supply lines on the receiving side.

During operation of power regulator circuit 1205, first and second parasitic inductors 1220a, 1220b, respectively, cannot immediately cease carrying current when the power regulator stops drawing current from input supply 1210 (Vin), such as for example when M1 (see FIG. 1) switches off. When M1 shuts off abruptly while carrying current, the residual energy within first and second parasitic inductors 1220a, 1220b, may ring with one or more components within power regulator circuit 1205.

To minimize or reduce the ringing (i.e., input supply noise), zero current switching may be used, where the current in first and second parasitic inductors 1220a, 1220b, respectively is brought to near zero before turning off M1. Such transitions are described in more detail above where current in the circuit may be detected and the switch is operated once the current has decayed to approximately zero. In other embodiments, the abrupt transition from carrying current through M1 to M1 opening and immediately ceasing carrying current may be slowed, by transitioning M1 more slowly from the on state to the off state. More specifically, in one embodiment if there is residual current in inductor 173, M4 may be turned on to dissipate the current in the inductor. However, if the current transitions too quickly from M1 to M4 noise may be created in the system. Thus, in some embodiments M4 may be turned on relatively slowly so the current may slowly transition from going through M1 to going through M4, creating a "quieter" switching transition. In one example embodiment, a transistor may be fabricated with a 28 nm process having a normal solid-state switching transition speed of approximately 10 ps. To reduce ringing, in one embodiment a slowed transition may be approximately ten times slower at 100 ps. In further embodiments the slowed transition may be between five times and fifteen times slower. In other embodiments, the slowed transition may be between 3 times and 17 times slower, as compared to a normal transition time. The slower transition turning M1 off may allow the current be slowly reduced in first and second parasitic inductors 1220a, 1220b, such that the ringing with on chip components is minimized or eliminated.

In further embodiments, zero current switching and the power regulation circuits disclosed herein may enable switching speeds that operate between 1 MHz and 500 MHz. In other embodiments the switching speed may be between 50 MHz and 200 MHz. In further embodiments the switching speed may be approximately 100 MHz.

Figure 13:
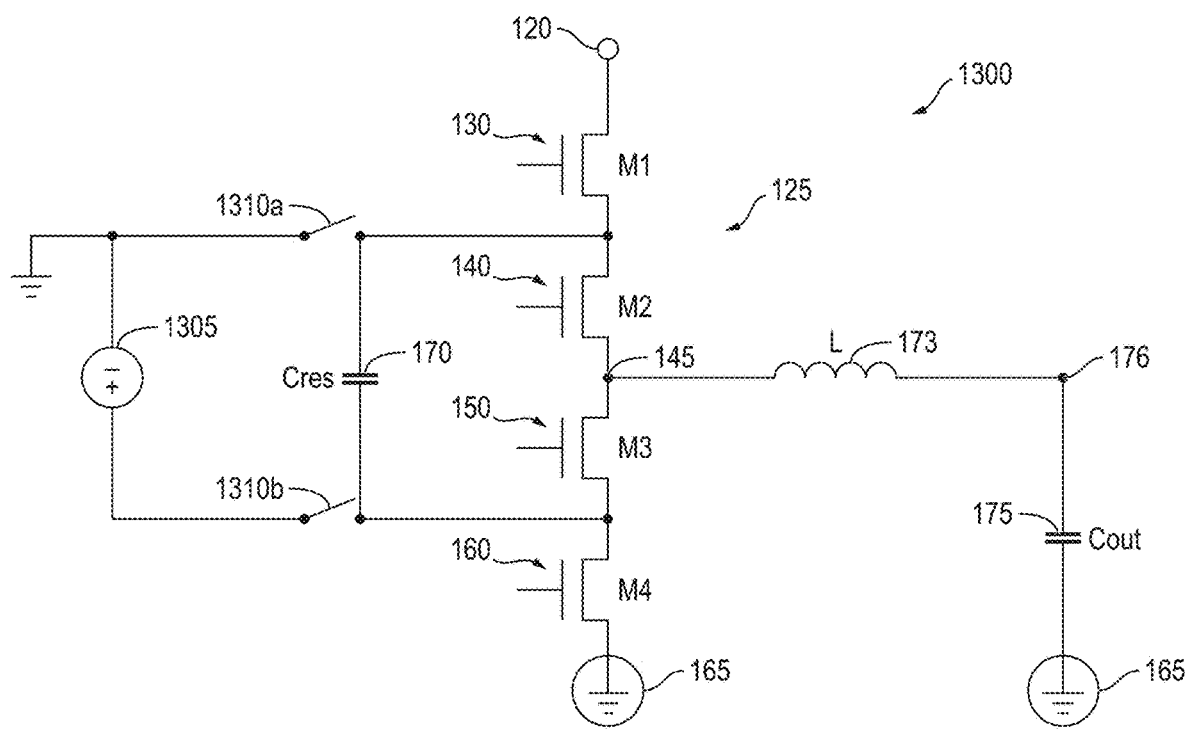
FIG. 13 is a schematic of the switched regulation circuit shown in FIG. 2 with an added power supply coupled to the circuit with a pair of switches according to an embodiment of the invention.

Now referring to FIG. 13, in further embodiments a boost circuit 1300 may be made by combining switched regulation circuit 125 with a power supply 1305 that is coupled to capacitor 170 with first and second solid-state switches 1310a, 1310b, respectively. In this embodiment capacitor 170 may be precharged by power supply 1305 such that when the capacitor is connected to input terminal 120 (Vin) it acts like a battery and increases or decreases the voltage potential supplied to switched regulation circuit 125. In one example embodiment, capacitor 170 may be precharged to −2 volts, such that when the switching sequence starts and the capacitor and inductor are connected to first terminal 120 (Vin) at 2.5 volts, a potential of 4.5 volts is applied to the capacitor and the inductor.

More specifically, referring to FIG. 3, step 305 and FIG. 9, step 305, instead of shorting capacitor 170 and completely discharging it, the capacitor may alternatively be coupled to power supply 1305 where it is precharged, such that in step 320 in FIGS. 3 and 9 when the capacitor is connected to Vin, the voltage applied to capacitor 170 and inductor 176 may be higher than Vin. In other embodiments the precharging may be used to increase the range of switched regulation circuit 125 when not operating under boost. Other configurations and variations of switched regulation circuit 125 and methods of precharging the capacitor are within the scope of this disclosure. For example, in one embodiment the power supply that is used for the precharging may be located on the same die as switched regulation circuit 125. In some embodiments the power supply may be a low drop out regulator, a switched capacitor or a switching regulator that are on the same die. In other embodiments the power supply may not be located on the same die as switched regulation circuit 125.

Regulator with Inductor Preflux

In another embodiment a switched regulation circuit 125 (see FIG. 2) may be configured to preflux the inductor 173 such that the switched regulation circuit may deliver an increased output voltage and/or increased output current, as discussed in more detail below.

Figure 14:
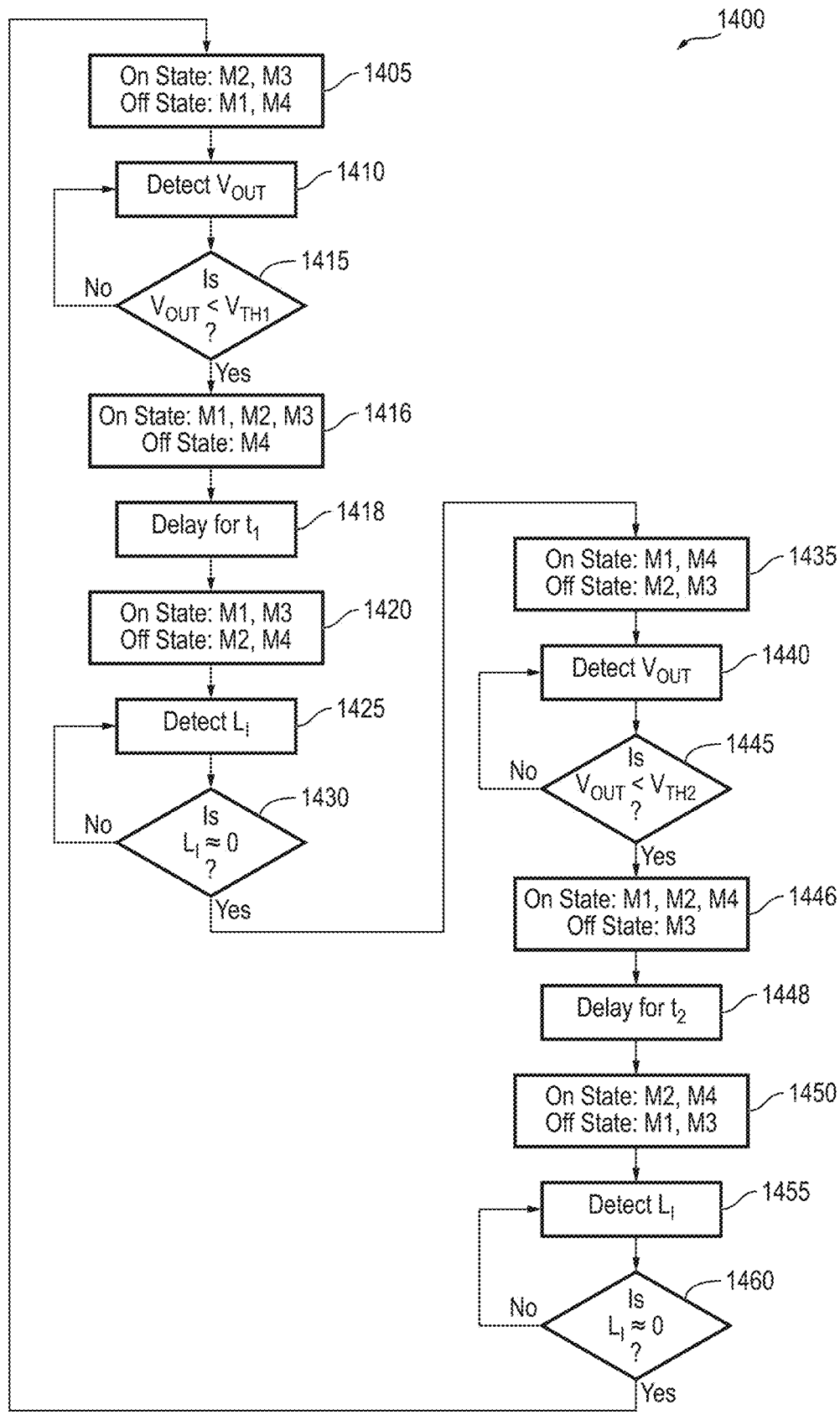
FIG. 14 is a flowchart of a repetitive switching sequence for the switched regulation circuit in FIG. 2 according to an embodiment of the invention.
Figure 15:
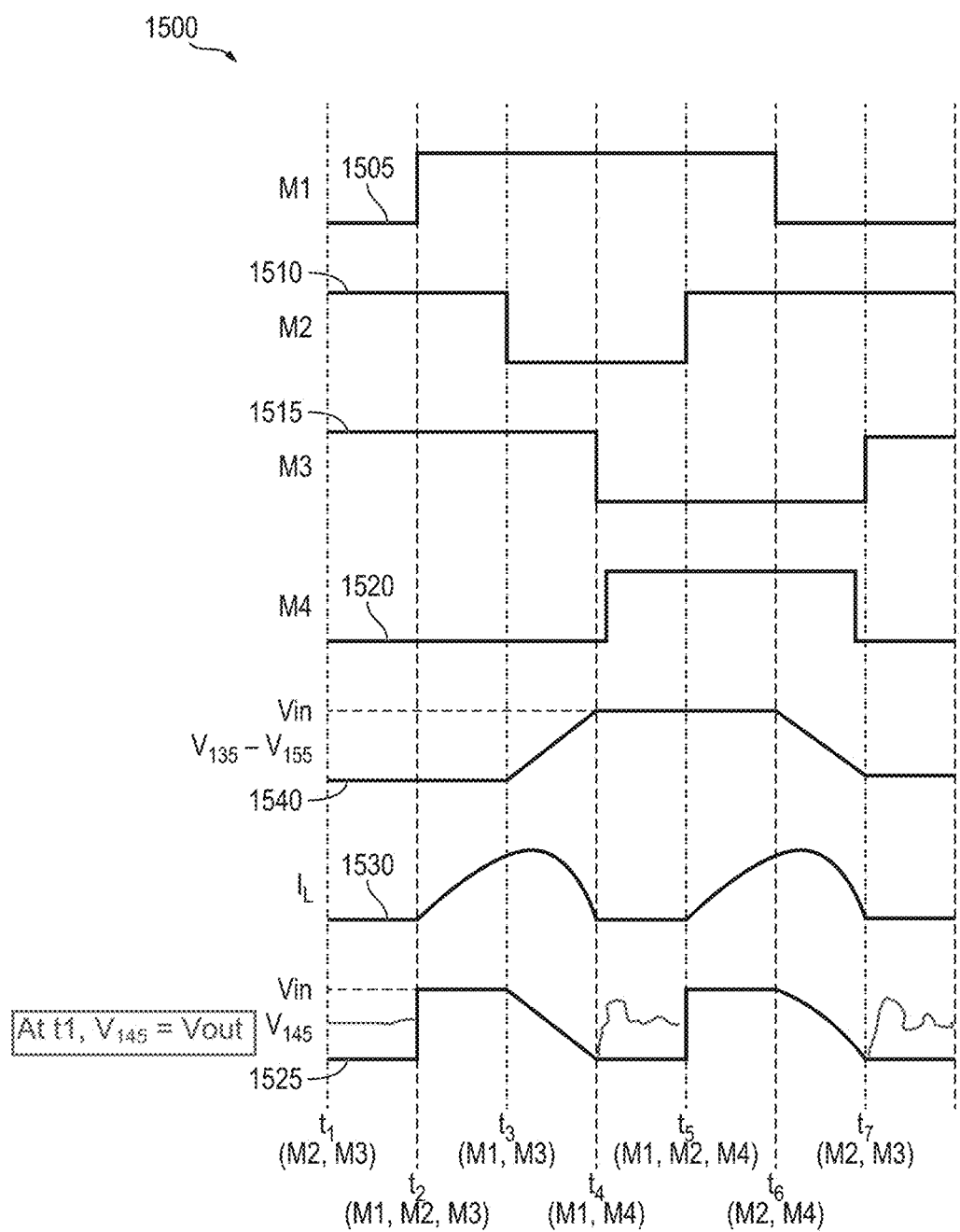
FIG. 15 is a timing diagram of voltages and currents within the switched regulation circuit of FIG. 2 according to the switching sequence in FIG. 14.

Now referring simultaneously to FIGS. 2, 14 and 15 an embodiment of a switching sequence and timing diagram for switched regulation circuit 125 with inductor preflux is illustrated. More specifically, FIG. 2 illustrates a simplified schematic of the switched regulation circuit 125, FIG. 14 illustrates a switching sequence 1400 having sequential steps 1405 through 1460 for the four switches in switched regulation circuit and FIG. 15 illustrates an example timing diagram, showing the control signals delivered to each of the four solid-state switches as well as the voltage at second junction 145, the current within inductor 173 ($I_L$), and the voltage across capacitor 170 ($V_{135}$-$V_{155}$). The switching sequence illustrated in FIGS. 14 and 15 is for example only and other sequences, timings and configurations are within the scope of this disclosure.

Now referring to FIG. 14, a switching sequence 1400 having sequential steps 1405 through 1460 is illustrated. In step 1405, second and third solid-state switches M2, M3, respectively, are controlled to be in an on state and first and fourth solid-state switches M1, M4 are controlled to be in an off state. Capacitor 170 is in a shorted condition, allowing any residual charge within the capacitor to dissipate such that the capacitor is discharged.

Example currents and voltages within switched regulation circuit 125 for step 1405 are illustrated in timing diagram 1500 in FIG. 15. For signals M1, M2, M3, M4, the logic levels are indicated. A logic high level (sometimes noted as 1) indicates the switch (or composite switch) is on, a logic low (sometimes noted as 0) indicates the switch is off. First step 1405 occurs at time t1. Trace 1505 illustrates a control signal applied to first solid-state switch 130. In the particular embodiment depicted in diagram 1500, switches are turned on when approximately 1 volt is applied. At time t1 trace 1505 is at approximately 0 volts thus first solid-state switch 130 is off. Trace 1510 illustrates a control terminal voltage applied to second solid-state switch 140. At time t1 trace 1510 is at approximately 1 volt thus second solid-state switch is on. Trace 1515 illustrates a control terminal voltage applied to third solid-state switch 150. At time t1 trace 1515 is approximately 1 volt thus third solid-state switch 150 is on. Trace 1520 illustrates a control terminal voltage applied to fourth solid-state switch 160. At time t1 trace 1520 is at approximately 0 volts thus fourth solid-state switch is off.

Trace 1525 illustrates a voltage at second junction 145. At time t1, inductor current ($I_L$) is approximately zero and capacitor 170 is shorted so second junction 145 is approximately at a voltage of (Vout) 176. Trace 1530 illustrates current through inductor 173. At time t1 inductor 173 is decoupled from the remainder of switched regulation circuit 125 thus the current in inductor 173 is approximately zero. Trace 1540 illustrates the voltage across capacitor 170. At time t1 capacitor 170 is shorted causing the voltage across capacitor 173 to decrease to approximately zero volts as the capacitor is discharged.

Now referring back to FIG. 14, after the controller sets the solid-state switches to their respective states identified in step 1405, it advances to step 1410 were it detects the voltage at output node 176 (Vout). In some embodiments Vout may be detected using comparator 195 (see FIG. 1) as discussed above, or by any other method. Advancing to step 1415 the controller may detect if the voltage at output node 176 has decreased below a first threshold voltage ($V_{TH1}$). If Vout remains above $V_{TH1}$ then the controller continues to detect Vout (i.e., returns to step 1410) until Vout drops below $V_{TH1}$. In some embodiments the controller may cyclically detect Vout then compare it to $V_{TH1}$, while in other embodiments the controller may respond to a signal, such as from a comparator, that Vout has decreased below $V_{TH1}$. Myriad methods may be used to detect Vout, compare it to $V_{TH1}$ and notify the controller.

Now referring back to FIG. 14, step 1415, once Vout drops below $V_{TH1}$ the controller advances to step 1416 where first solid-state switch M1 is turned on, second and third solid-state switches M2 and M3 remain on and fourth solid-state switch M4 remains off. Step 1416 is the first inductor prefluxing state where current in the inductor is linearly increased by the application of a voltage at first output terminal 120 (Vin) to the inductor before capacitor 170 is charged. The prefluxing step enables switched regulation circuit 125 circuit to deliver increased output voltage and/or output current as compared to the switching configurations described above. In this state the voltage at first terminal 120 (Vin) is applied directly across inductor 173.

Now referring to timing diagram 1500, the first prefluxing state is shown at t2. The voltage at second junction 145 rapidly increases to the Vin voltage (minus a relatively small voltage drop across M1 and M2) at first node 120 shown by trace 1525. Current in inductor 170 (trace 1530) increases rapidly, corresponding to the applied voltage and the characteristics of inductor 173. For some embodiments, the voltage at 176 may change a relatively small amount compared with the voltage across the inductor and thus the current may increase substantially linear at a rate approximated by Vin−Vout where Vout is the voltage at 176. The current in inductor 173 continues until the switch state is changed, which in one embodiment may be controlled by a timer shown in step 1418. In some embodiments the timer in step 1418 may be a variable timer that can use a lookup table to adjust according to different load conditions and demands on switched regulation circuit 125. In further embodiments the timer in step 1418 may be variable and may be controlled by a feedback loop based on one or more characteristics of switched regulation circuit 125. In some embodiments the timer may be adjusted by the feedback loop to energize inductor 173 with an appropriate amount of current so that the inductor current resonates to zero just when capacitor 170 becomes fully charged (discussed in the next step 1420).

In some embodiments, the timer can be made utilizing a current on a capacitor. That current starts charging at the beginning of the preflux cycle and may be compared to a voltage. When the voltage on the capacitor reaches a specified voltage the timer indicates that the preflux cycle should end. In other embodiments this function can be done utilizing logic gates. Other timers disclosed herein may use similar techniques.

In one embodiment a feedback loop may be used to monitor the current in inductor 173 and adjust the timer. In some embodiments, if the current is still positive when capacitor 170 becomes fully charged, the timer may be reduced for the next charging cycle. Conversely, if the current in inductor 173 goes to zero before capacitor 170 becomes fully charged, the timer may be increased for the next cycle. In some embodiments, the loop may use an analog loop. In some embodiments, a DAC can be used to adjust the timer by changing one or more of a current, a capacitor, a voltage threshold on a comparator or a numbers of logic gates.

In some embodiments, instead of a timer for setting the preflux, the current can be monitored during preflux and have the preflux cycles end when the current reaches a specified level. That specified level can be adjusted on a cycle by cycle basis to optimize performance. That performance can be to reach a specified average current supplied or so that the voltage on the capacitor and current in the inductor reaches zero at approximately the same time. Other timers disclosed herein may use similar techniques.

In further embodiments that employ a soft braking methodology, discussed in more detail below, the timer can be set to be at least as long as needed to preflux inductor 173 so the current never reaches zero before capacitor 170 is fully charged and soft braking can be used to transition the remaining current in inductor 173. Other embodiments may use different techniques to control the timer and are within the scope of this disclosure.

Now referring back to FIG. 14, after the timer has run, the controller advances to step 1420 where first and third solid-state switches M1 and M3 remain on while the second solid-state switch M2 is turned off and the fourth solid-state switch remains off. Thus, first and third solid-state switches, M1, M3, respectively, are on while second and fourth solid-state switches M2, M4, respectively, are off. In this state the voltage at first terminal 120 (Vin) is applied directly to second junction 145. Capacitor 170 was fully discharged in the step 1405 and now begins to charge. Capacitor 170 charges with a time constant set by capacitor 170 and inductor 173 values. Further, as capacitor 170 begins to charge, current flow in inductor 173 increases as the voltage between 145 and the output is positive. Because of the prefluxing operation in step 1416, the current that was already flowing in inductor 173 continues to increase, as discussed in more detail below.

Step 1420 is illustrated in timing diagram 1500 (see FIG. 1500) at time t3. Now referring simultaneously to FIGS. 2 and 15, at time t3, second solid-state switch 140 (i.e., trace 1510) turns off. The voltage at second junction 145 (i.e., trace 1525) begins to decrease. Current in inductor 173 (trace 1530) continues to build as capacitor 170 charges. Voltage in capacitor 170 (trace 1540) increases towards Vin. As capacitor 170 becomes charged the current increases in inductor 173 (trace 1530) slows and reverses when the voltage at node 145 equals the voltage at 176 and starts reducing as the capacitor gets fully charged at t4. Thus, in step 1420 capacitor 170 charges, causing a current to flow in inductor 173, and increasing the voltage at output node 176 (Vout). The controller then proceeds to step 1425 (see FIG. 14).

In step 1425, the current in inductor 173 (LI) is detected. In some embodiments the current may be detected as illustrated in FIG. 1 with comparator 187. In one embodiment comparator 187 monitors current flow through first solid-state switch 130 by comparing a voltage difference between first terminal 120 and first side 181 of capacitor 170. As the voltage difference decreases, the current commensurately decreases in both first solid-state switch 130 and inductor 173. Referring now to step 1430 in FIG. 14, once current in inductor 173 is approximately equal to zero, the controller proceeds to step 1435. In the timing diagram 1425 and 1430 are shown as discrete steps, while in one embodiment, the current in Li can be continuously monitored during the 1420 conduction cycle. In further embodiments steps 1425 and 1455 can be similar to steps 356 and 355 in FIG. 9 where both inductor current and capacitor voltage are monitored.

In step 1435, third solid-state switch M3 turns off and fourth solid-state switch M4 turns on while second solid-state switch M2 remains off. As discussed above, since the transition to step 1435 only occurs when the current in inductor 176 is approximately zero, the transition to step 1435 may employ zero current switching. Zero current switching occurs when the current through the solid-state switch is approximately zero, before changing the state of the switch. This reduces switching losses, reduces input supply noise, and improves the efficiency of switched regulation circuit 125, as discussed in more detail below.

Continuing to refer to step 1435 in FIG. 14, in some embodiments the switching transitions may occur simultaneously while in other embodiments there may be slight delays between switch transitions. In the embodiment illustrated in FIG. 15, at t4 switch M4 may have a slight delay such that it turns on after M3 turns off. This configuration is essentially an off state, where the system is substantially at steady-state. Other embodiments may have a different off state configuration. In some embodiments only M4 may be on while M1, M2 and M3 are off. In further embodiments, all solid-state switches may be in an off position, while in other embodiments third solid-state switch 150 may be the only switch in an on state which connects capacitor 170 to inductor 173. Other off state solid-state switch configurations are within the scope of this disclosure.

Step 1435 of FIG. 14 is illustrated in timing diagram 1500 of FIG. 15, at time t4. Now referring simultaneously to FIGS. 2 and 15, at time t4 third solid-state switch 150 turns off and fourth solid-state switch 160 turns on slightly afterwards. First solid-state switch 130 remains on and second solid-state switch 140 remains off. After the switching transitions, second junction 145 (i.e., trace 1525) goes to the voltage at Vout (e.g., it resonates with inductor 173 and parasitic capacitance at junction 145). Voltage across capacitor 170 (i.e., trace 1540) remains at a charged level and the current in inductor 173 (i.e., trace 1530) remains near zero. In step 1440 the voltage at output node 176 (Vout) may be detected with comparator 195 (see FIG. 1) as discussed above in step 1410. In other embodiments, Vout may be detected using a different method. As shown in step 1445, the controller advances to step 1446 when Vout drops below a second threshold voltage ($V_{TH2}$).

Now referring to FIG. 14, step 1446, first fourth solid-state switches, M1 and M4 remain on, second solid-state switch M2 turns on, and third solid-state switches M3 remains off. This is the second inductor prefluxing stage where current in inductor 173 is increased by applying voltage at first output terminal 120 (Vin) to the inductor before the energy within capacitor 170 is discharged to the inductor. The prefluxing step enables switched regulation circuit 125 circuit to deliver increased output voltage and/or output current as compared to the switching configurations described above. In this state the voltage at first terminal 120 (Vin) is applied directly across inductor 173.

Now referring to timing diagram 1500, the second prefluxing state is shown at t5. The voltage at second junction 145 rapidly increases to the Vin voltage at first node 120 shown by trace 1525. Current in inductor 170 (trace 1530) increases rapidly, corresponding to the applied voltage and the characteristics of inductor 173. In some embodiment the rate of current increase can be substantially similar to the rate of current increase in the time between t2 and t3. The current in inductor 173 continues to increase until the switch state is changed, which in one embodiment may be controlled by a timer shown in step 1448. In some embodiments the timer in step 1448 may be a variable timer that can use a lookup table to adjust according to different load conditions and demands on switched regulation circuit 125. In further embodiments the timer in step 1448 may be variable and may be controlled by a feedback loop based on one or more characteristics of switched regulation circuit 125. In some embodiments the timer may be adjusted by the feedback loop to energize inductor 173 with an appropriate amount of current so that the inductor current resonates to zero just when capacitor 170 becomes fully discharged (discussed in the next step 1450). Other timer techniques as discussed herein may be used and are within the scope of this disclosure. In some embodiments the timer technique may be the same for multiple steps within the switching sequence.

In one embodiment a feedback loop may be used to monitor the current in inductor 173 and if the current is still positive when capacitor 170 becomes fully discharged, the timer may be reduced for the next charging cycle. Conversely, if the current in inductor 173 goes to zero before capacitor 170 becomes fully discharged, the timer may be increased for the next cycle. In further embodiments that employ a soft braking methodology, discussed in more detail below, the timer can be set to be at least as long as needed to preflux inductor 173 so the current never reaches zero before capacitor 170 is fully discharged and soft braking can be used to transition the remaining current in inductor 173. Other embodiments may use different techniques to control the timer and are within the scope of this disclosure.

Now referring to FIG. 14, step 1450, second and fourth solid-state switches M2, M4 remain on and first solid-state switch M1 is turned on while third solid-state switch M3 remains off. Capacitor 170 is connected between inductor 173 and ground 165, allowing the charge stored in the capacitor to discharge through the inductor to load 115 (see FIG. 1). As capacitor 170 begins to discharge (with a time constant set by capacitor 170 and inductor 173), current in inductor 173 continues to increase and voltage at output node 176 (Vout) increases. This condition is illustrated in timing diagram 1500 in FIG. 15 at time t6.

Now simultaneously referring to FIGS. 2 and 15, at time t6 first solid-state switch 130 (i.e., trace 1505) turns off. The voltage at second junction 145 (i.e., trace 825) begins to decrease. As capacitor 170 resonates with inductor 173, it discharges (i.e., trace 1540) causing current to continue to increase in inductor 173 (i.e., trace 1530). This causes the voltage at Vout to increase. As the charge in capacitor 170 is reduced, current in inductor 173 may reverse and decreases (i.e., trace 1530). The controller then advances to steps 1455 and 1460 (see FIG. 14).

In step 1455, the current in inductor 173 is detected. In some embodiments the current may be detected as illustrated in FIG. 1 with comparator 190. In further embodiments, comparator 190 (see FIG. 1) may be used to monitor the current through fourth semiconductor switch 160 and indirectly through inductor 173, by detecting a voltage differential between ground 165 and second side 191 of capacitor 170. In other embodiments different methods may be used to detect current in inductor 173.

Referring now simultaneously to FIGS. 14 and 15, in step 1460, once the current in inductor 173 is approximately equal to zero, the controller proceeds back to step 1405, where third solid-state switch M3 is turned on and second solid-state switch M2 remains on while first solid-state switch M1 remains off and fourth solid-state switch M4 is turned off. Thus, M2 and M3 are on while M1 and M4 are off. In some embodiments, M4 may be turned on slightly before M3 is turned off. This configuration shorts capacitor 170, repeating the entire switching sequence 1400. As discussed above, since the current in inductor 173 and fourth solid-state switch M4 is at or near zero during the transition from step 1460 to 1405, zero current switching methods may be used to decrease switching losses, reduce input supply noise and improve efficiency, as discussed in more detail below.

In the particular switching sequence illustrated in FIG. 14, each solid-state switch may be configured to turn on and off only once during each repetitive switching cycle. Such a sequence may enable improved efficiency by reducing the number of switching transitions and minimizing switching efficiency losses. In other embodiments, different switching configurations and sequences may be used where one or more switches may be turned on and off more than once.

Figure 16:
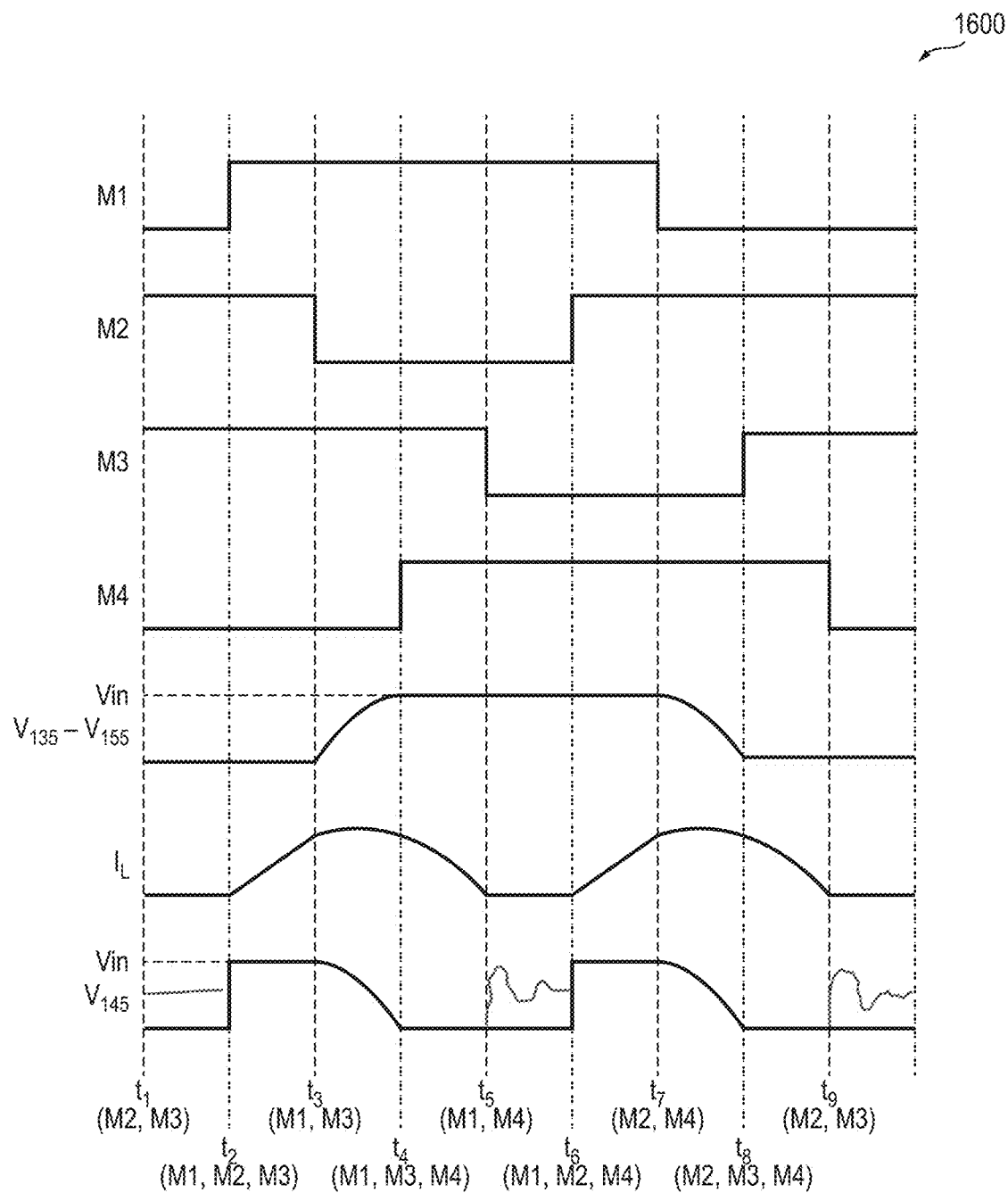
FIG. 16 is a timing diagram of voltages and currents within the switched regulation circuit of FIG. 2 according to the switching sequence in FIG. 14 including "soft braking"

Now referring to FIG. 16, timing diagram 1600 is illustrated which is a timing diagram for a similar switching sequence as sequence 1500 in FIG. 15, however timing diagram 1600 has two added "soft braking" steps. As discussed above, in some embodiments the timer steps (1418 and 1448 in FIG. 14) may be set to ensure that the prefluxing steps add sufficient energy to inductor 173 so the current never reaches zero before capacitor 170 is fully charged during the charging cycle (or fully discharged during the discharging cycle) and soft braking can be used to transition the remaining current in inductor 173. Soft braking may enable a higher current per phase and/or a smaller capacitor 170 per phase as compared to the methodologies discussed above.

In one embodiment a switching sequence where M1, M3 and M4 are on while M2 is off may be located after step 1430 in FIG. 14. In another embodiment a switching sequence where M2, M3 and M4 are on while M1 is off may be added after step 1460. The first soft braking sequence is labeled as t4 in FIG. 16 and the second soft braking switch sequence is labeled as t8. Other methodologies and switching sequences may be used and are within the scope of this disclosure.

Figure 17:
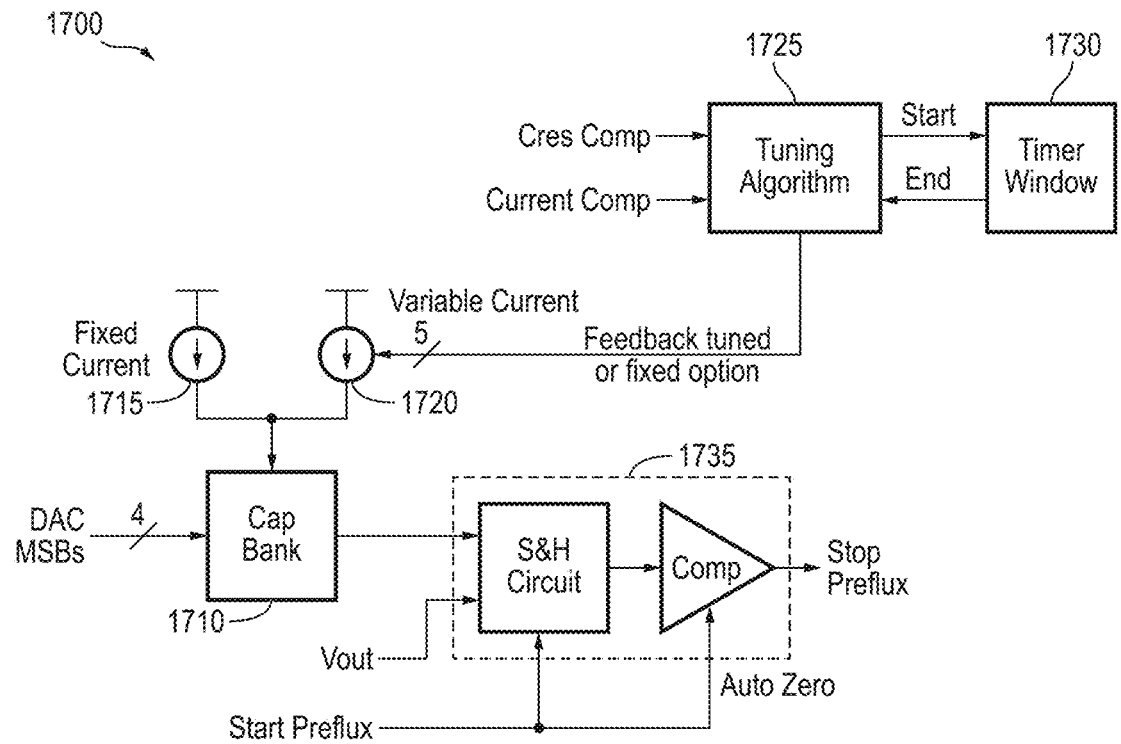
FIG. 17 is a method of controlling the preflux time with a variable timer.

Now referring to FIG. 17 one embodiment of a preflux timer method 1700 will be described. Preflux timer method 1700 is an example of a preflux timer that is proportional to one or more of the various characteristics of the regulator, however other preflux timers may also be proportional to one or more of the various characteristics of the regulator and may have different schematics and/or configurations which are within the scope of this disclosure.

In some embodiments the pre-flux timer may be a digitally programmed timer based on Vout/Vin (i.e., the duty factor) as described in more detail below. In further embodiments the accuracy of the timer may effect the efficiency of the circuit and thus it may be desirable to implement methods of increased accuracy.

In one embodiment preflux timer 1700 may use a switched capacitor bank 1710 that can be programmed to activate a specific number of capacitors using the most significant bits (MSB) of a digital to analog conversion (DAC) code that represents a target output voltage of the circuit. That is, the MSB's may represent and be used set the target output voltage for the circuit. For example, in one embodiment a higher target output voltage may correspond to a higher number of active capacitors in capacitor bank 1710 and a lower target output voltage may correspond to a lower number of active capacitors in the capacitor bank.

In some embodiments the active capacitors in capacitor bank 1710 may be charged using a fixed current source 1715 in combination with a variable current source 1720. Variable current source 1715 may be controlled by a variable feedback signal which is an output of a preflux tuning algorithm 1725. Tuning algorithm 1725 may be configured to adjust variable current source 1720 based on input from a Cres comparator and a current comparator, such as those discussed above. In one embodiment tuning algorithm 1725 may be configured to adjust the variable feedback signal to control the variable current source 1720 with a goal of the Cres comparator and the current comparator tripping at the same time. In further embodiments tuning algorithm 1720 may cause the inductor to be energized with an appropriate amount of current so current within the inductor resonates to zero at the same time as when the capacitor becomes fully charged. A timer window 1730 may be set at a value such that if the Cres comparator and the current comparator trip within the timer window time, that tuning algorithm 1725 makes no changes to variable current source 1720. However, if Cres comparator trips faster or slower than the current comparator by a time that is greater than timer window 1730, tuning algorithm 1725 adjusts feedback/variable current 1720 in a way to make Cres comparator closer in time to the current comparator. In some embodiments timer window 1730 may be fixed while in other embodiments it may be variable and may be programmable.

In one embodiment tuning algorithm 1725 may use the following steps, while other embodiments may use different steps:

Step 1: If current comparator trips first, increase the pre-flux time. Otherwise go to Step 2.
Step 2: Start 100 pS timer window after Cres comparator trips. Go to Step 3.
Step 3: If 100 pS timer window expires before the current comparator trips reduce the pre-flux time. If 100 pS timer window does not expire before the current comparator trips make no changes to the preflux time. Go to Step 1.

In some embodiments, capacitor bank 1710 may have a capacitor bank output voltage that feeds into a comparator 1735. In one embodiment comparator 1735 may include a sample and hold function as well as a comparator function and may have a set point that is adjusted with the variable feedback signal, as discussed above. Comparator 1735 may also use a output voltage of the circuit (Vout) as an input to compare with the capacitor bank output voltage. In one embodiment comparator 1735 may sample the output voltage of the circuit (Vout) when the preflux operation begins, then continuously sample the capacitor bank output voltage and compare it to the Vout. Once the capacitor bank output voltage ramps up and becomes equal to Vout, comparator 1735 may transmit a signal to stop the preflux operation.

In one embodiment the sample and hold function may have an auto zero comparator and may be employed to compare the ramping capacitor bank output voltage with the sampled value of Vout. In some embodiments Vout sampling may avoid any active/continuous (destabilizing) feedback from Vout on the timer calculation since in some embodiments the preflux Vout may ramp up very fast. The output of comparator 1735 may be used to send a signal to stop the inductor prefluxing operation.

Thus, in some embodiments preflux timer 1700 may have three variables to control the preflux time including, 1) the tuning algorithm 1725, 2) the DAC MSB setting (i.e. the target output voltage) and 3) the actual output voltage of the circuit (Vout). In further embodiments one or a combination of these variables may be used. For example in one embodiment only the DAC MSB setting may be used to adjust the target output voltage and the tuning algorithm may have a fixed current (as opposed to a variable current) and the Vout may use a fixed reference voltage (as opposed to the actual Vout voltage).

Figure 18:
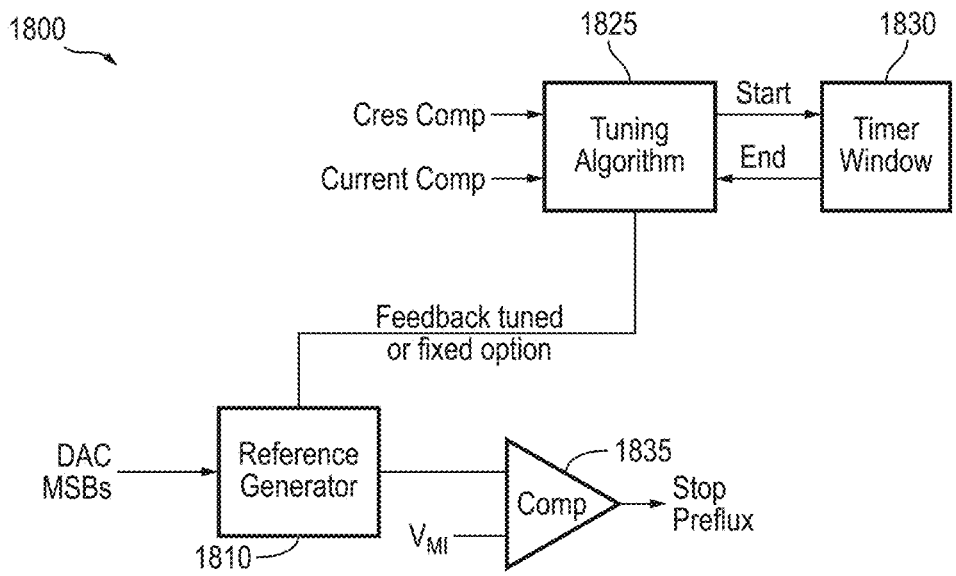
FIG. 18 is an alternative method of controlling the preflux time with a variable timer.

Now referring to FIG. 18 another embodiment of a preflux timer method 1800 will be described. Preflux timer method 1800 is similar to method 1700 however method 1800 is a simplified version removing the programmable capacitor bank and the sample and hold functions. Similar to preflux timer method 1700, preflux timer method 1800 is also proportional to one or more of the various characteristics of the regulator.

In one embodiment preflux timer 1800 may use a reference generator 1810 to generate a reference voltage from two inputs. The first input may be the DAC/MSBs described above that represents a target output voltage of the circuit. The second input may be a comparator set point that uses a variable input from a feedback loop controlled by the output of a preflux tuning algorithm 1825. Tuning algorithm 1825 may be configured to adjust the feedback based on input from a Cres comparator and a current comparator, such as those discussed above. In one embodiment tuning algorithm 1825 may be configured to adjust the feedback with a goal of the Cres comparator and the current comparator tripping at the same time. In further embodiments tuning algorithm 1820 may cause the inductor to be energized with an appropriate amount of current so current within the inductor resonates to zero at the same time as when the capacitor becomes fully charged. A timer window 1830 may be set at a value such that if the Cres comparator and the current comparator trip within the timer window time, that tuning algorithm 1825 makes no changes to the feedback. However, if Cres comparator trips faster or slower than the current comparator by a time that is greater than timer window 1830, tuning algorithm 1825 adjusts the feedback in a way to make Cres comparator closer in time to the current comparator. In some embodiments timer window 1830 may be fixed while in other embodiments it may be variable and may be programmable.

In some embodiments, reference voltage generator 1810 may have a reference voltage output that feeds into a comparator 1835. Comparator 1835 may also use a voltage across one of the solid-state switches described above in FIG. 1 such as M1, M2, M3 or M4. In one embodiment the voltage across M1 ($V_{M1}$) may be used as an input to comparator 1835 to compare with reference generator 1810 voltage. In some embodiments the first solid-state switch M1 may have a characteristic resistance so the input (e.g., $V_{M1}$) is proportional to the current in the inductor 173 (see FIG. 1) when M1 is in an on state allowing current to flow through the inductor. The output of comparator 1835 may be used to send a signal to stop the inductor prefluxing operation.

In further embodiments a comparator to monitor a voltage across a one of the solid-state switches described above in FIG. 1 such as M1, M2, M3 or M4 may be made using a ratiometric circuit. For example, in one embodiment a voltage across a relatively large M1 solid-state transistor may be monitored by fabricating a scaled down solid-state transistor M1x on the same die. In some embodiments, for example, M1x may be one one-thousandth the size of M1 and M1x may have the same gate voltage and source voltage as M1. The current of M1x may go to a current sink and a current comparator may be used to monitor the current through M1x as compared to a reference current. Since M1x is one one-thousandth the size of M1 the reference current may be set to one one-thousandth of the desired current in M1 so the comparator trips when the desired current in M1 is reached. In one embodiment second junction 145 (see FIG. 1) can be used as the reference input to the comparator. This may enable the copied current in M1x to match the current in M1. Note that in some embodiments the M1 solid-state switch may be in linear conduction (not saturation), therefore M1x may need the same gate drive voltage and same drain source voltage to copy the current accurately. In other embodiments a different ratio or other comparator methods may be used and are within the scope of this disclosure.

Regulator with Continuous Current

In other embodiments switched regulation circuit 125 (see FIG. 2) can be configured to provide continuous current and/or an increase in current to load 115 by maintaining the current in inductor 173 above zero, as described in more detail below.

Figure 19:
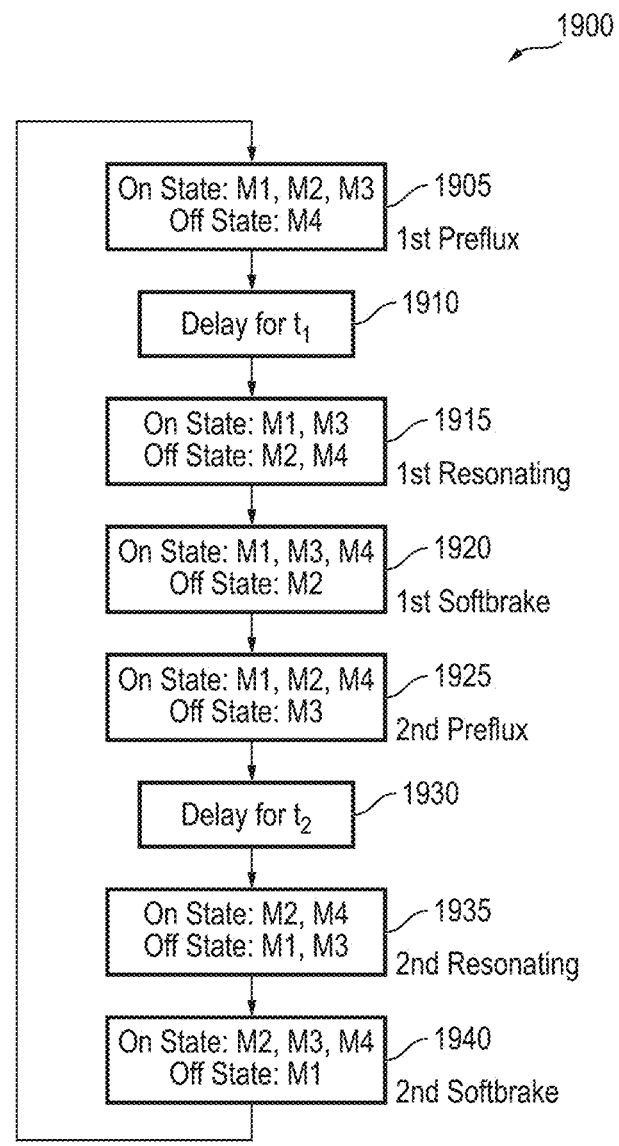
FIG. 19 is a flowchart of a repetitive switching sequence providing a continuous current output for the switched regulation circuit in FIG. 2 according to an embodiment of the invention.
Figure 20:
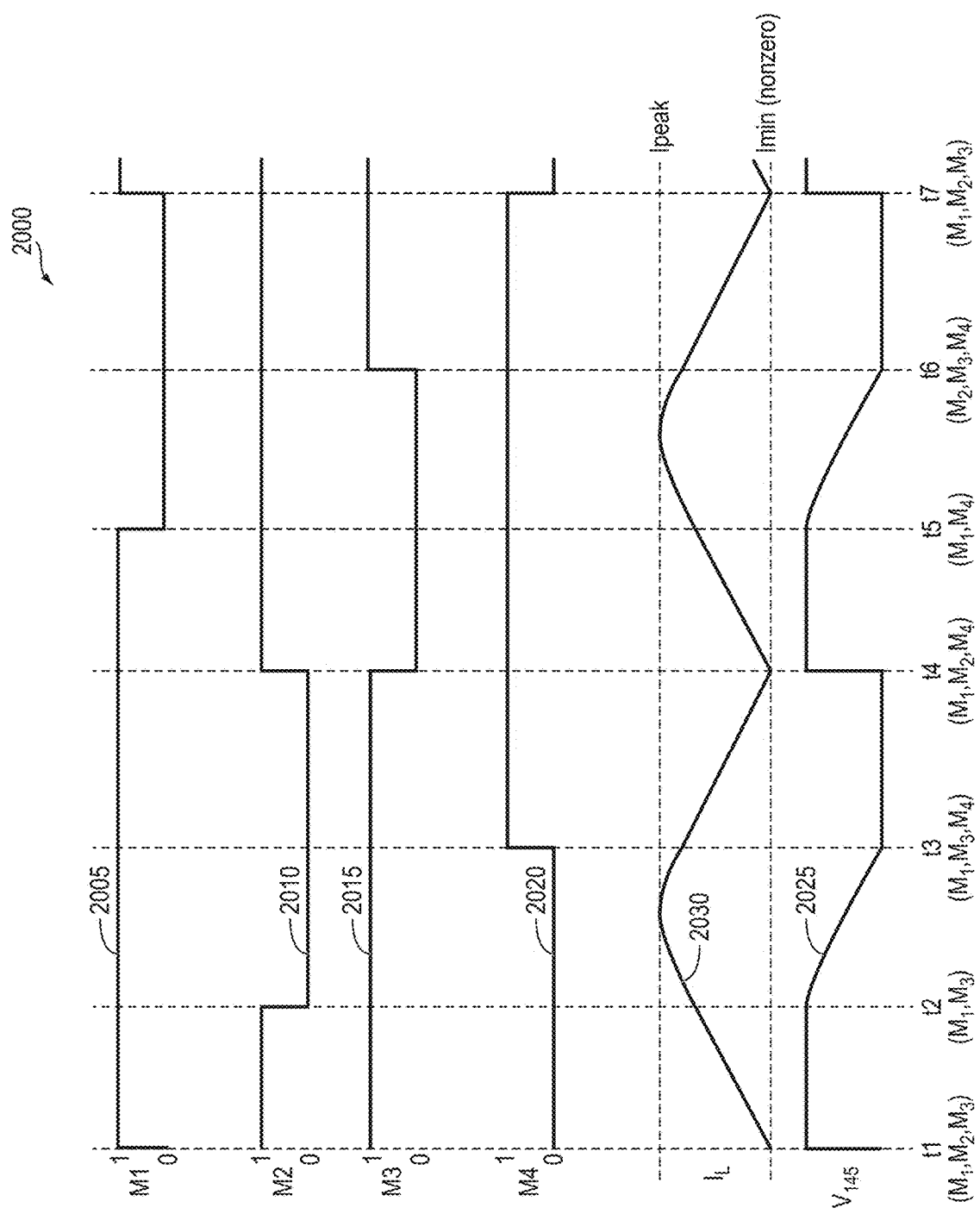
FIG. 20 is a timing diagram of voltages and currents within the switched regulation circuit of FIG. 2 according to the switching sequence in FIG. 19.

Now referring simultaneously to FIGS. 2, and 19-26 an example switching sequence and timing diagram for an embodiment of switched regulation circuit 125 (see FIG. 2)

with continuous and/or increased current is illustrated. More specifically, FIG. 2 illustrates a simplified schematic of switched regulation circuit 125; FIG. 19 illustrates an example switching sequence 1900 having sequential steps 1905 through 1940 for the four switches in switched regulation circuit 125; FIG. 20 illustrates an example timing diagram showing the control signals delivered to each of the four solid-state switches as well as the current within inductor 173 ($I_L$), and the voltage at second junction 145 ($V_{145}$) during switching sequence 1900; and FIGS. 21-26 illustrate simplified circuit schematics of each of the six different solid-state switch configurations described in switching sequence 1900. In FIGS. 21-26 solid-state switches that are in an on state are depicted with solid lines and solid-state switches that are in an off state are depicted with dashed lines. The switching sequence illustrated in FIG. 19 is for example only and other switching sequences, timings and configurations are within the scope of this disclosure.

Figure 21:
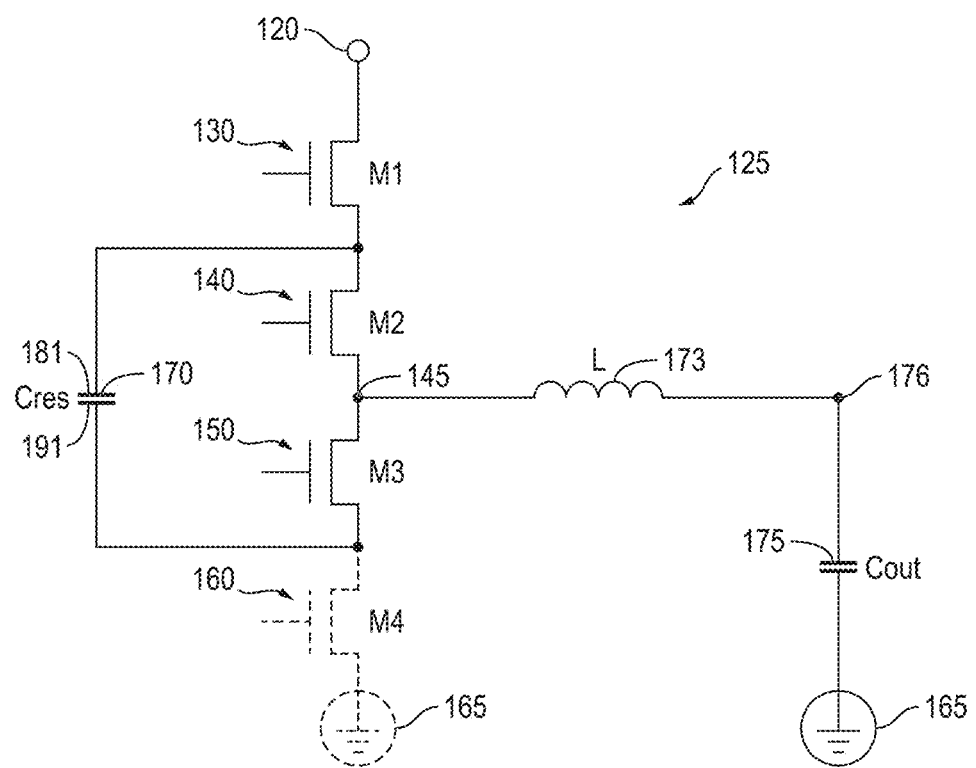
FIG. 21 is a schematic of the switched regulation circuit shown in FIG. 2 in a particular switch configuration according to the switching sequence in FIG. 19.

Now referring to FIG. 19, switching sequence 1900 having sequential steps 1905 through 1940 is illustrated. In step 1905, first, second and third solid-state switches M1, M2 and M3, respectively, are controlled to be in an on state and fourth solid-state switch M4 is controlled to be in an off state. A simplified schematic of switched regulation circuit 125 in step 1905 is illustrated in FIG. 21. Step 1905 is a first inductor prefluxing state where current in inductor 173 (see FIG. 2) is increased at a substantially linear rate by the application of the input voltage at first terminal 120 (Vin) across the inductor, at a time before capacitor 170 is charged.

Example currents and voltages within switched regulation circuit 125 for step 1905 are illustrated in timing diagram 2000 (see FIG. 20). The logic levels for solid-state switch control signals M1, M2, M3, M4 are indicated by traces 2005, 2010, 2015 and 2020, respectively. A high logic level (sometimes noted as 1) indicates the switch (or composite switch) is in an on state, and a low logic level (sometimes noted as 0) indicates the switch is in an off state.

Timing diagram 2000 illustrates that first step 1905 occurs at time t1. At time t1, trace 2005 shows that a high logic level control signal is applied to first solid-state switch 130, placing it in an on state. Trace 2010 illustrates that at time t1 a high logic level control signal is applied to second solid-state switch 140, placing it in an on state. Trace 2015 illustrates that at time t1 a high logic level control signal is applied to third solid-state switch 150, placing it in an on state. Trace 2020 illustrates that at time t1 a low logic level control signal is applied fourth solid-state switch 160, placing it in an off state.

Continuing to refer to timing diagram 2000, at t1 a voltage at second junction 145 (see FIG. 2) is illustrated by trace 2025 and is substantially equivalent to the Vin voltage (minus a relatively small voltage drop across M1 and M2) at first node 120. Current in inductor 170 ($I_L$ trace 2030) increases rapidly, corresponding to the applied voltage and the characteristics of inductor 173. For some embodiments, the voltage at node 176 (see FIG. 2) may change a relatively small amount compared with the voltage across the inductor and thus the current may increase substantially linear at a rate approximated by (Vin−Vout)/L where Vout is the voltage at node 176. The current in inductor 173 continues to increase while in this switch state, the duration of which may be controlled by a timer, shown in step 1910 as a delay.

In some embodiments the timer in step 1910 can be fixed while in other embodiments it can be a variable timer. In one example the variable timer can use a lookup table to adjust according to different load conditions and demands on switched regulation circuit 125. More specifically, in some embodiments the timer can be set proportional to a "duty factor" (e.g., Vout/Vin) such that a longer amount of time is selected when a higher Vout is required. In further embodiments the timer in step 1910 can be controlled by a feedback loop based on one or more characteristics of switched regulation circuit 125. In some embodiments the timer may be adjusted by the feedback loop to energize inductor 173 with an appropriate amount of current so that the inductor current resonates to a predetermined current when the first resonating state is engaged (discussed in the next step 1915). In further embodiments the timer can use a comparator that compares the current in the inductor to a programmable current threshold.

In other embodiments, the timer can be made utilizing a current on a capacitor wherein the current starts charging at the beginning of the preflux cycle and may be compared to a predetermined voltage. When the voltage on the capacitor reaches a specified voltage the timer indicates that the preflux cycle should end. In other embodiments the timer function can be performed utilizing logic gates.

In some embodiments, instead of a timer for setting the amount of preflux, the current in the inductor can be monitored during preflux (e.g., step 1905) and the preflux cycle can be set to end when the current reaches a specified level. That specified current level can be adjusted on a cycle by cycle basis to optimize performance. Other timer techniques and timer architectures can be used and are within the scope of this disclosure.

Figure 22:
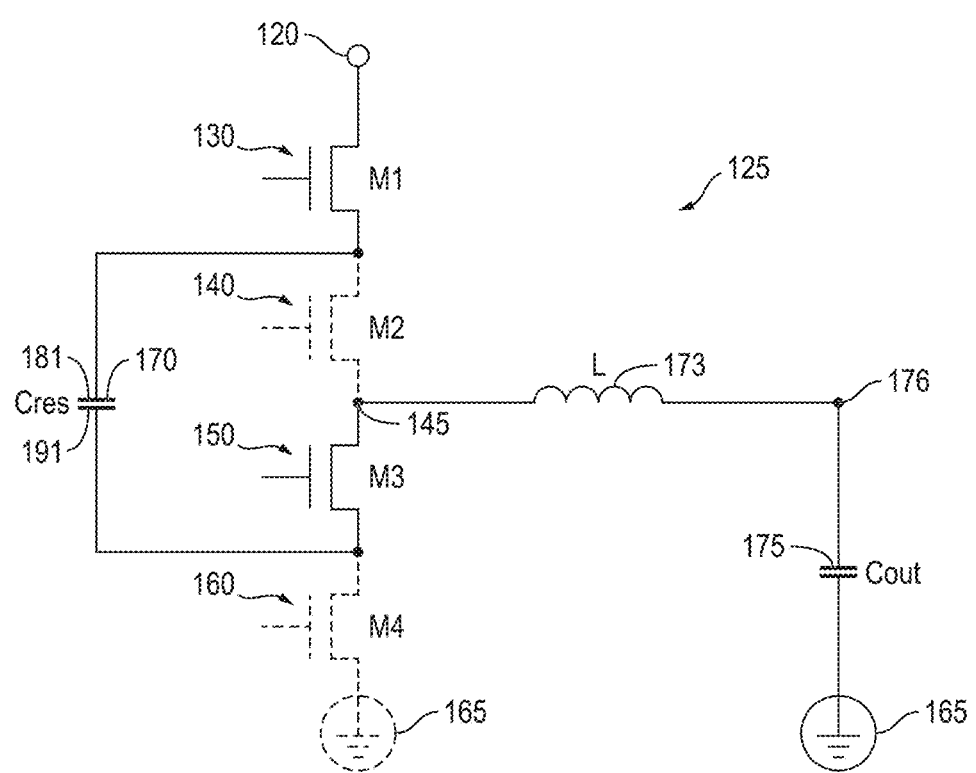
FIG. 22 is a schematic of the switched regulation circuit shown in FIG. 2 in a particular switch configuration according to the switching sequence in FIG. 19.

Now referring to FIG. 19, after the delay in step 1910, the controller advances to step 1915 where first and third solid-state switches M1 and M3 remain on while the second solid-state switch M2 is turned off and the fourth solid-state switch M4 remains off. Thus, first and third solid-state switches, M1, M3, respectively, are on while second and fourth solid-state switches M2, M4, respectively, are off. A simplified schematic of switched regulation circuit 125 in step 1915 is illustrated in FIG. 22. This state couples capacitor 170 in series with inductor 173 and the voltage at first terminal 120 (Vin) is applied directly to second junction 145. Capacitor 170 now begins to charge. Capacitor 170 charges with a time constant set by capacitor 170 and inductor 173 values. Further, as capacitor 170 begins to charge, current flow in inductor 173 continues to increase as the voltage between second junction 145 and the output is positive. Because of the prefluxing operation in step 1905, the current that was already flowing in inductor 173 continues to increase, as discussed in more detail below.

Step 1915 is illustrated in timing diagram 2000 (see FIG. 20) at time t2. Now referring simultaneously to FIGS. 2 and 20, at time t2, second solid-state switch 140 (i.e., trace 2010) turns off. The voltage at second junction 145 (i.e., trace 2025) begins to decrease. Current in inductor 173 (trace 2030) continues to build as capacitor 170 charges. Voltage in capacitor 170 increases towards Vin. As capacitor 170 becomes charged the current in inductor 173 (trace 2030) peaks, then begins to decrease when the voltage at node 145 equals the voltage at node 176 and continues to decrease towards time t3. Thus, in step 1915, capacitor 170 charges, causing a current to flow in inductor 173, and increasing the voltage at output node 176 (Vout). When capacitor 170 is fully charged to the voltage at (Vin) 120, the controller proceeds to step 1920 (see FIG. 19) which is a first "soft braking" configuration that can be used to transition the current remaining in inductor 173. Soft braking can enable a higher current per phase and/or a smaller capacitor 170 per phase as compared to the methodologies discussed above and as explained in more detail below.

Figure 23:
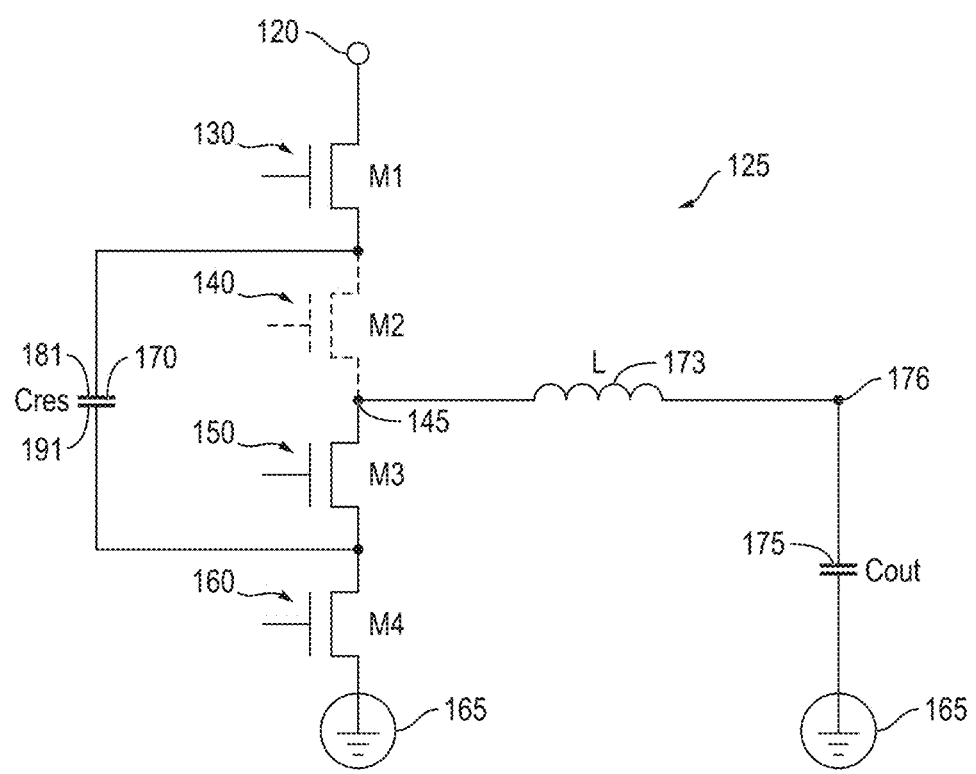
FIG. 23 is a schematic of the switched regulation circuit shown in FIG. 2 in a particular switch configuration according to the switching sequence in FIG. 19.

In the first soft braking configuration (step 1920) first, third and fourth solid-state switches M1, M3 and M4, respectively, are on while second solid-state switch M2 is turned off. A simplified schematic of switched regulation circuit 125 in step 1920 is illustrated in FIG. 23. In this state inductor 173 is coupled to Vin (node 120) through capacitor 170 and also to ground 165 through third and fourth solid-state switches, M3 and M4, respectively, allowing the residual current in the inductor to continue to decrease down to a non-zero minimum current (Imin).

Step 1920 is illustrated in timing diagram 2000 (see FIG. 20) at time t3. Now referring simultaneously to FIGS. 2 and 20, at time t3, fourth solid-state switch 160 (i.e., trace 2020) turns on adding a path between inductor 173 and ground 165. The voltage at second junction 145 (i.e., trace 2025) remains at the ground potential and current in inductor 173 (trace 2030) continues to decrease as the inductor dissipates its stored energy. Current in inductor 173 continues to decrease to a predetermined minimum current (Imin) that is non-zero in this particular embodiment. In some embodiments the minimum current (Imin) can be between 10 milliamps and 50 amperes, while in other embodiments it can be between 100 milliamps and 1 ampere and in another embodiment it can be between 200 milliamps and 400 milliamps. The controller then proceeds to step 1925 (see FIG. 19) that is a second prefluxing state that can be used to increase current flowing through inductor 173.

Figure 24:
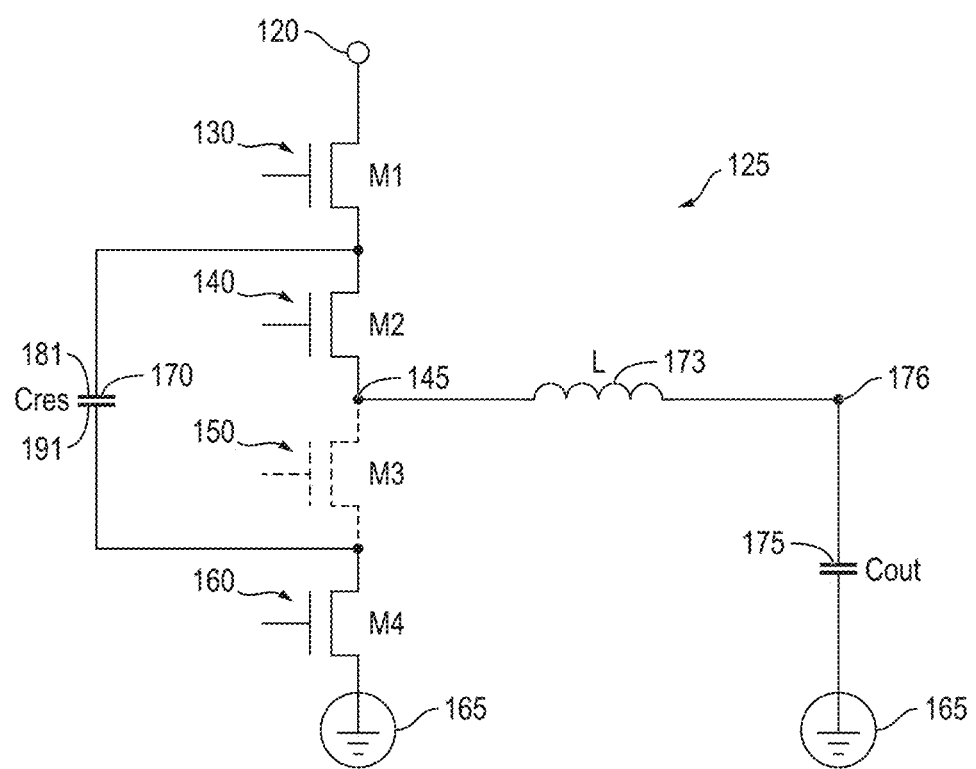
FIG. 24 is a schematic of the switched regulation circuit shown in FIG. 2 in a particular switch configuration according to the switching sequence in FIG. 19.

Now referring to FIG. 19, in step 1925 first fourth solid-state switches, M1 and M4 remain on, second solid-state switch M2 turns on, and third solid-state switches M3 remains off. A simplified schematic of switched regulation circuit 125 in step 1925 is illustrated in FIG. 24. This is the second inductor prefluxing stage where current in inductor 173 is increased at a substantially linear rate by applying voltage at first output terminal 120 (Vin) to the inductor. In this state the voltage at first terminal 120 (Vin) is applied directly across inductor 173.

Now referring to timing diagram 2000, the second prefluxing state (step 1925) is shown at t4. The voltage at second junction 145 rapidly increases to the Vin voltage at first node 120 shown by trace 2025. Current in inductor 170 (trace 2030) increases rapidly, corresponding to the applied voltage and the characteristics of inductor 173. In some embodiments the rate of current increase can be substantially similar to the rate of current increase in the time between t1 and t2. The current in inductor 173 continues to increase until the switch state is changed, which in one embodiment, may be controlled by a delay shown in step 1930 that can be controlled by a timer, as discussed above.

Figure 25:
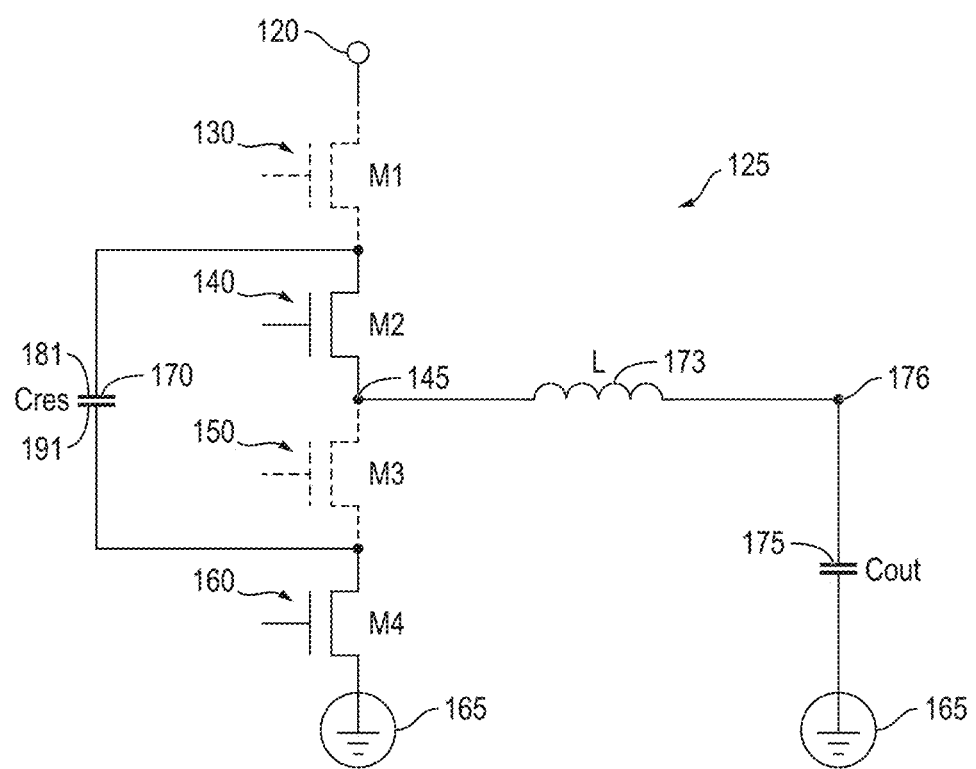
FIG. 25 is a schematic of the switched regulation circuit shown in FIG. 2 in a particular switch configuration according to the switching sequence in FIG. 19.

Now referring to FIG. 19, in step 1935 fourth solid-state switch M4 remains on and second solid-state switch M2 is turned on while first and third solid-state switches M1, M3, respectively, remain off. A simplified schematic of switched regulation circuit 125 in step 1935 is illustrated in FIG. 25. Capacitor 170 is connected between inductor 173 and ground 165, allowing the charge stored in the capacitor to discharge through the inductor to load 115 (see FIG. 1). As capacitor 170 begins to discharge (with a time constant set by capacitor 170 and inductor 173), current in inductor 173 increases. This condition is illustrated in timing diagram 2000 in FIG. 20 at time t5 showing the voltage at second junction 145 (i.e., trace 2025) at a voltage that is close to the voltage at Vin (120) as it is connected to fully charged capacitor 170. As capacitor 170 resonates with inductor 173, it discharges causing current to increase in inductor 173 (i.e., trace 2030). The increase in current causes the voltage at Vout (node 176) to increase. As the charge stored in capacitor 170 is reduced, current in inductor 173 peaks (Ipeak), then begins to decrease (trace 2030).

The controller then proceeds to step 1940 (see FIG. 19) which is a second "soft braking" configuration that can be used to transition the remaining current in inductor 173. Soft braking can enable a higher current per phase and/or a smaller capacitor 170 per phase as discussed above.

Figure 26:
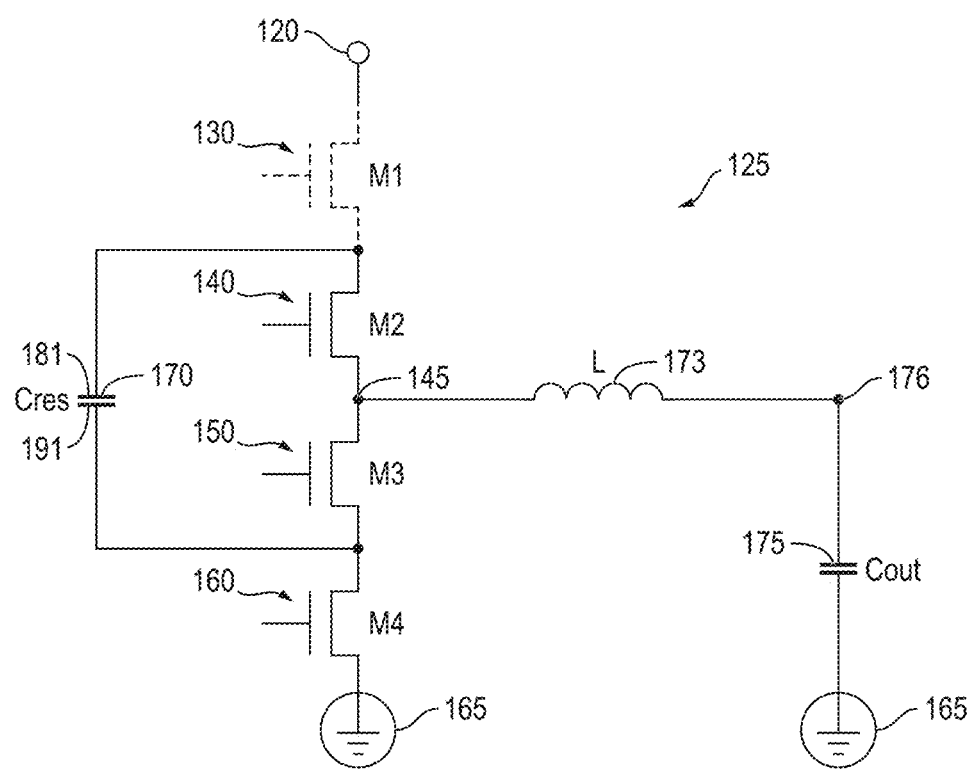
FIG. 26 is a schematic of the switched regulation circuit shown in FIG. 2 in a particular switch configuration according to the switching sequence in FIG. 19.

More specifically, in step 1940 second, third and fourth solid-state switches M2, M3 and M4, respectively, are on while first solid-state switch M1 is turned off. A simplified schematic of switched regulation circuit 125 in step 1935 is illustrated in FIG. 26. In this state inductor 173 is coupled to ground 165 through third and fourth solid-state switches, M3 and M4, respectively, allowing the residual current in the inductor to continue to decrease down to a non-zero minimum current (Imin).

Step 1940 is illustrated in timing diagram 2000 (see FIG. 20) at time t6. Now referring simultaneously to FIGS. 2 and 20, at time t6, third solid-state switch 150 (i.e., trace 2015) turns on adding a path between inductor 173 and ground 165. The voltage at second junction 145 (i.e., trace 2025) remains at the ground potential and current in inductor 173 (trace 2030) continues to decrease as the inductor dissipates its stored energy. Current in inductor 173 continues to decrease to a predetermined minimum current (Imin) that is non-zero in this particular embodiment. The controller then returns to step 1905 (see FIG. 19) which is the first prefluxing state that can be used to increase current flowing through inductor 173.

Timing diagram 2000 in FIG. 20 is for illustration only and is one example of the function of circuit 125 (see FIG. 2) operating with a non-zero inductor current. Other switching algorithms, control functions and features can be implemented without departing from this disclosure. To control the duration of any of steps 1905-1940 illustrated in FIG. 19 any type of timer or control circuit can be used, including those disclosed herein. For example, in some embodiments a comparator can be used to compare output voltage (Vout) to a commanded voltage. If the output voltage is too low the controller can shorten the soft brake duration and start the next preflux step early, leading to a higher output voltage and higher average output current delivered to load 115 (see FIG. 1). This control algorithm can also provide a relatively fast response time to loads having high transient voltage requirements. In further embodiments a multi-phase architecture can be employed where multiple switched regulation circuits 125 (see FIG. 2) are used together to provide power to load 115.

In further embodiments alternative switching sequences 1900 can be used to provide additional features and functions of switched regulation circuit 125 (see FIG. 2). For example, wait states can be added after first and second soft brake steps (steps 1920 and 1940, respectively) to provide light load performance. More specifically, when load 115 (see FIG. 1) requires a reduced amount of current and/or voltage, after first softbrake (step 1920) a wait state can be commanded where first and fourth solid-state switches, M1 and M4, respectively are on and second and third solid-state switches, M2 and M3 are off. This essentially halts current flow through circuit 125 to load 115 (see FIG. 1) until the subsequent preflux step 1925 is commanded. Similarly, after second soft brake (step 1940) a second wait state can be commanded where second and third solid-state switches, M2 and M3, respectively, are on and first and fourth solid-state switches, M1 and M4, respectively, are off. This state essentially halts current flow through circuit 125 until the subsequent preflux step 1905 is commanded.

Figure 27:
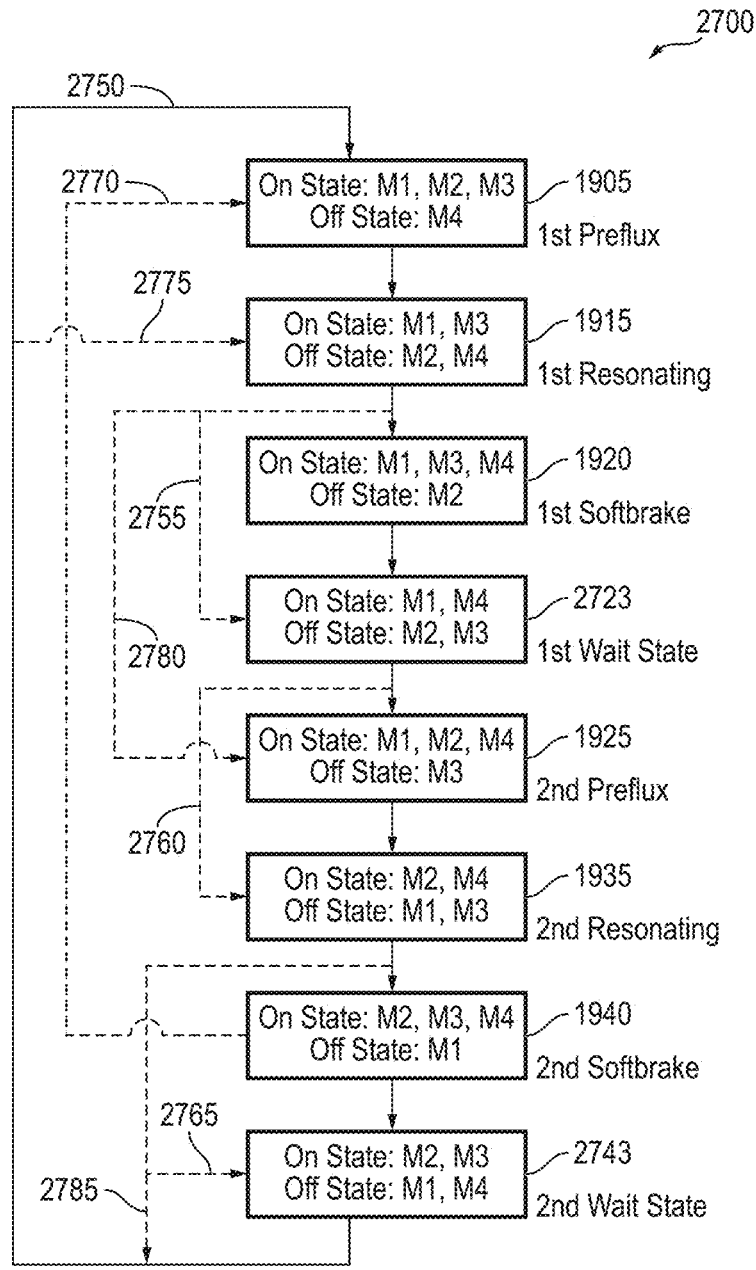
FIG. 27 is a flowchart of a example switching sequences for the switched regulation circuit in FIG. 2 according to embodiments of the invention.

Now referring to FIG. 27 a switching sequence 2700 is illustrated that depicts additional example switching sequences that can be used to provide additional features and functions of switched regulation circuit 125 (see FIG. 2). Many of the switch configurations in switching sequence 2700 are similar to the switch configurations in FIG. 19, where like numbers refer to similar configurations (e.g., switch configuration 1905 in FIG. 19 corresponds to switch configuration 1905 in FIG. 27), however switching sequence 2700 adds two additional switch configurations (step 2723) and (step 2743) that are waiting states that allow the switched regulation circuit 125 to operate under light load conditions. As further illustrated in switching sequence 2700 there are also several alternative switching sequences, identified by lines 2750, 2755, 2760, 2765, 2770, 2775, 2780 and 2785, each of which will be discussed in more detail below.

In one example, switching sequence 2700 includes steps (1915, 1920, 2723, 1935, 1949 and 2743) and thus first and second preflux steps 1905, 1925, respectively, are not performed. Instead of following the sequential switching sequence, in this example, switching sequence 2700 follows paths 2760 and 2775, skipping first and second preflux steps 1905, 1925, respectively. The omission of first and second preflux steps 1905, 1925, respectively, can result in a reduction of the current flowing through inductor 173. This sequence can be used to deliver lower current and/or voltage to load 115 (see FIG. 1). In some embodiments either first preflux step 1905 or second preflux step 1925 can be skipped independently of each other to provide a relatively fast response to changing load requirements.

In another example, switching sequence 2700 includes steps (1905, 1915, 2723, 1925, 1935 and 2743) and thus first and second soft brake steps 1920, 1940, respectively, are not performed. Instead of following the sequential switching sequence, in this example switching sequence 2700 follows paths 2755 and 2765, skipping first and second soft brake steps 1920, 1940, respectively. The omission of first and second soft brake steps 1920, 1940, respectively, can be used in embodiments where capacitor 170 (see FIG. 2) is relatively large and becomes fully charged/discharged at the same time the current in inductor 173 nears zero. Therefore, since the capacitor can "absorb" substantially all of the energy from the inductor, there is little to no current left in the inductor at the end of the resonating steps for the soft brake steps to dissipate. In a similar example, switching sequence 2700 can skip not only first and second soft brake steps 1920, 1940, respectively, but can also skip first and second wait steps, 2723 and 2743, respectively. In this case the loading conditions on switched regulation circuit 125 are sufficient that the controller does not need to lower output current and/or voltage by using waiting states (steps 2723 and 2743). In this example switching sequence 2700 follows paths 2780 and 2785, skipping steps 1920, 2723, 1940 and 2743.

In another example, switching sequence 2700 can be used to change the operation of switched regulation circuit 125 (see FIG. 2) between a continuous current output mode and a discontinuous current output mode of operation based on one or more parameters of switched regulation circuit 125. More specifically, in some embodiments, during operation the demands of load 115 can change and controller 180 can respond by increasing or decreasing the output current of switched regulation circuit 125 by altering switching sequence 2700, as described in more detail below.

In some embodiments under light load conditions, controller 180 can skip one or more steps in switching sequence 2700 during the continuous uninterrupted operation of switched regulation circuit 125. In one example an autonomous transition to an alternative switching sequence can occur during first and/or second softbrake steps, steps 1920 and 1940, respectively. The transition can be the result of the voltage at (Vout) 176 being above or below a predetermined threshold voltage or in response to any parameter of the circuit.

In one example the voltage at (Vout) 176 is above a predetermined threshold voltage, (e.g., the load does not need additional power) and controller 180 seamlessly transitions switching sequence 2700 to a discontinuous current mode of operation. In some embodiments a discontinuous current mode results when controller 180 ends first and/or second softbrake steps, steps 1920 and 1940, respectively when the current in inductor 173 reaches zero (e.g., a discontinuous current output). Controller 180 can further proceed to first and/or second wait states, steps 2723 and 2743, respectively until the controller 180 determines that load 115 requires more power (e.g. (Vout) 176 drops below the predetermined threshold voltage).

In some embodiments if during first and/or second softbrake steps, steps 1920 and 1940, respectively, the voltage at (Vout) 176 is below the predetermined threshold voltage, (e.g., the load requires additional power) controller 180 can truncate the duration of first and/or second softbrake steps, steps 1920 and 1940, respectively, and advance to first and/or second preflux states, steps 1905 and 1925, respectively, to increase the output current and/or transition to a continuous current mode of operation.

In further embodiments controller 180 can shorten or lengthen the duration of any step within switching sequence 2700 in response to one or more parameters of switched regulation circuit 125. As another illustrative example, if the current in inductor 173 is decreasing while switched regulation circuit 125 is in first and/or second resonating modes, steps 1915 and 1935, respectively, and load 115 requires additional power, controller 180 can end the step early and can transition to first and/or second preflux states, steps 1905 and 1925, respectively, to increase the output current and/or transition to a continuous current mode of operation.

In further embodiments switched regulation circuit 125 can use a first and a second levels of current within inductor 173 to control operation of the operation of the circuit. More specifically a voltage at the load can be regulated by repetitively (1) charging the capacitor causing an increase in current flow in the inductor followed by a decrease in current flow in the inductor and before the current flow in the inductor reaches a first level, (2) discharging the capacitor causing an increase in current flow in the inductor followed by a decrease in current flow in the inductor and before the current flow in the inductor reaches a second level, repeating (1). The first and the second levels can be set by controller 180 or any other circuit and are based on one or more electrical characteristics of switched regulation circuit 125. In some embodiments first and second levels can be substantially equal to 0 amperes however in other embodiments they may have a positive or a negative value. In further embodiments the first and the second levels can have different values.

Other switching sequences are within the scope of this disclosure and the switch configurations shown in FIG. 27 do not need to be performed in any particular order or for a particular time. Further, the switch configurations shown in FIG. 27 do not indicate that the same sequence must be repetitively performed during operation of switched regulation circuit 125 (see FIG. 2). More specifically, because of the flexibility of the design of switched regulation circuit 125 (see FIG. 2) the switching sequence can be modified at any time by controller 180 (see FIG. 1) as illustrated by, but not limited to lines 2750, 2755, 2760, 2765, 2770, 2775, 2780 and 2785. That is, based on the inputs to controller, controller 180 can immediately change switching sequences, for example by skipping first softbrake (step 1920) and proceeding to first wait state (step 2723), proceeding to second preflux (step 1925), proceeding to second resonating (step 1935) and proceeding to second softbrake (step 1940). Thus, just because the controller skipped the first softbrake (step 1920) it does not necessarily have to skip second softbrake (step 1940).

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A power conversion circuit comprising: a plurality of serially connected solid-state switches coupled between an input terminal and a ground; an output terminal positioned between two of the plurality of solid-state switches; an inductor coupled between the output terminal and a load; a capacitor coupled in parallel with two of the serially connected solid-state switches; and a controller configured to control the plurality of solid-state switches to generate a current in the inductor by repetitively (1) charging the capacitor causing a temporary increase in the current in the inductor, (2) entering a first wait state that configures the plurality of solid-state switches to maintain the capacitor in a charged state, (3) discharging the capacitor causing a temporary increase in the current in the inductor and (4) entering a second wait state that configures the plurality of solid-state switches to maintain the capacitor in a discharged state.

2. The power conversion circuit of claim 1 wherein the controller maintains the capacitor in the charged state until a voltage at the output terminal is below a threshold voltage.

3. The power conversion circuit of claim 1 wherein the controller maintains the capacitor in the discharged state until a voltage at the output terminal is below a threshold voltage.

4. The power conversion circuit of claim 1 wherein the controller skips (2) and (4) while a voltage at the output terminal is below a threshold voltage.

5. The power conversion circuit of claim 1 wherein the plurality of serially connected solid-state switches includes: a first solid-state switch having a pair of first switch terminals connected between the input terminal and a first junction; a second solid-state switch having a pair of second switch terminals connected between the first junction and a second junction; a third solid-state switch having a pair of third switch terminals connected between the second junction and a third junction; a fourth solid-state switch having a pair of fourth switch terminals connected between the third junction and the ground; wherein the capacitor is coupled between the first junction and the third junction, and the output terminal is coupled to the second junction.

6. The power conversion circuit of claim 1 wherein the load comprises a processor.

7. The power conversion circuit of claim 1 wherein the load, the plurality of serially connected solid-state switches and the controller are disposed on a unitary semiconductor substrate.

8. The power conversion circuit of claim 1 wherein when repetitively performing (1) through (4) a dis-continuous current flows through the inductor.

9. A unitary integrated circuit comprising: a unitary semiconductor substrate; a central processing unit circuit disposed on the unitary semiconductor substrate; a power regulator circuit configured to supply power to the central processing unit circuit and including: a plurality of serially connected solid-state switches disposed on the unitary semiconductor substrate, the plurality of serially connected solid-state switches coupled between an input terminal and a ground and including an output terminal; an inductor coupled between the output terminal and the central processing unit circuit; a capacitor coupled in parallel with two of the serially connected solid-state switches; and a controller disposed on the unitary semiconductor substrate and configured to control the plurality of solid-state switches to generate a current in the inductor by repetitively (1) charging the capacitor causing a temporary increase in the current in the inductor, (2) entering a first wait state that configures the plurality of solid-state switches to maintain the capacitor in a charged state, (3) discharging the capacitor causing a temporary increase in the current in the inductor and (4) entering a second wait state that configures the plurality of solid-state switches to maintain the capacitor in a discharged state.

10. The unitary integrated circuit of claim 9 wherein the controller maintains the capacitor in the charged state until a voltage at the output terminal is below a threshold voltage.

11. The unitary integrated circuit of claim 9 wherein the controller maintains the capacitor in the discharged state until a voltage at the output terminal is below a threshold voltage.

12. The unitary integrated circuit of claim 9 wherein the controller skips (2) and (4) while a voltage at the output terminal is below a threshold voltage.

13. The unitary integrated circuit of claim 9 wherein the plurality of serially connected solid-state switches includes: a first solid-state switch having a pair of first switch terminals connected between the input terminal and a first junction; a second solid-state switch having a pair of second switch terminals connected between the first junction and a second junction; a third solid-state switch having a pair of third switch terminals connected between the second junction and a third junction; a fourth solid-state switch having a pair of fourth switch terminals connected between the third junction and the ground; wherein the capacitor is coupled between the first junction and the third junction, and the output terminal is coupled to the second junction.

14. The unitary integrated circuit of claim 9 wherein when repetitively performing (1) through (4) a dis-continuous current flows through the inductor.

15. A method of operating a power conversion circuit to deliver power to a load, the method comprising: supplying power to a first terminal of the power conversion circuit with a power supply, the power conversion circuit comprising: a plurality of serially connected solid-state switches coupled between the first terminal and a ground; an output terminal positioned between two of the plurality of serially connected solid-state switches; an inductor coupled between the output terminal and the load; a capacitor coupled in parallel with two of the serially connected solid-state switches; and a controller coupled to each of the plurality of solid-state switches; operating the plurality of solid-state switches to generate a current in the inductor by repetitively (1) charging the capacitor causing a temporary increase in the current in the inductor, (2) entering a first wait state that configures the plurality of solid-state switches to maintain the capacitor in a charged state, (3) discharging the capacitor causing a temporary increase in the current in the inductor and (4) entering a second wait state that configures the plurality of solid-state switches to maintain the capacitor in a discharged state.

16. The method of claim 15 wherein the controller maintains the capacitor in the charged state until a voltage at the output terminal is below a threshold voltage.

17. The method of claim 15 wherein the controller maintains the capacitor in the discharged state until a voltage at the output terminal is below a threshold voltage.

18. The method of claim 15 wherein the controller skips (2) and (4) while a voltage at the output terminal is below a threshold voltage.

19. The method of claim 15 wherein the plurality of serially connected solid-state switches include: a first solid-state switch having a pair of first switch terminals connected between the first terminal and a first junction; a second solid-state switch having a pair of second switch terminals connected between the first junction and a second junction; a third solid-state switch having a pair of third switch terminals connected between the second junction and a third junction; a fourth solid-state switch having a pair of fourth switch terminals connected between the third junction and the ground; wherein the capacitor is coupled between the first junction and the third junction, and the output terminal is coupled to the second junction.

20. The method of claim 15 wherein when repetitively performing (1) through (4) a dis-continuous current flows through the inductor.

* * * * *